United States Patent
Huang

(10) Patent No.: US 7,464,006 B1
(45) Date of Patent: Dec. 9, 2008

(54) ANALYZING NONSTATIONARY FINANCIAL TIME SERIES VIA HILBERT-HUANG TRANSFORM (HHT)

(75) Inventor: Norden E. Huang, Bethesda, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 230 days.

(21) Appl. No.: 10/963,470

(22) Filed: Oct. 7, 2004

Related U.S. Application Data

(60) Provisional application No. 60/510,678, filed on Oct. 9, 2003.

(51) Int. Cl.
*G06F 15/00* (2006.01)
*H04B 15/00* (2006.01)

(52) U.S. Cl. .................................................. 702/190

(58) Field of Classification Search ................. 702/66, 702/67, 69, 70, 189–191, 195; 382/154, 382/190, 191
See application file for complete search history.

(56) References Cited

U.S. PATENT DOCUMENTS

| | | | | |
|---|---|---|---|---|
| 6,311,130 | B1 * | 10/2001 | Huang | 702/2 |
| 6,381,559 | B1 * | 4/2002 | Huang | 702/194 |
| 6,782,124 | B2 * | 8/2004 | Gloersen | 382/154 |
| 6,990,436 | B1 * | 1/2006 | Huang | 702/199 |
| 2002/0186895 | A1 * | 12/2002 | Gloersen | 382/285 |
| 2004/0078160 | A1 * | 4/2004 | Frei et al. | 702/79 |
| 2007/0030002 | A1 * | 2/2007 | Frei et al. | 324/309 |

* cited by examiner

*Primary Examiner*—Michael P Nghiem
(74) *Attorney, Agent, or Firm*—Christopher O. Edwards

(57) ABSTRACT

An apparatus, computer program product and method of analyzing non-stationary time varying phenomena. A representation of a non-stationary time varying phenomenon is recursively sifted using Empirical Mode Decomposition (EMD) to extract intrinsic mode functions (IMFs). The representation is filtered to extract intrinsic trends by combining a number of IMFs. The intrinsic trend is inherent in the data and identifies an IMF indicating the variability of the phenomena. The trend also may be used to detrend the data.

10 Claims, 45 Drawing Sheets

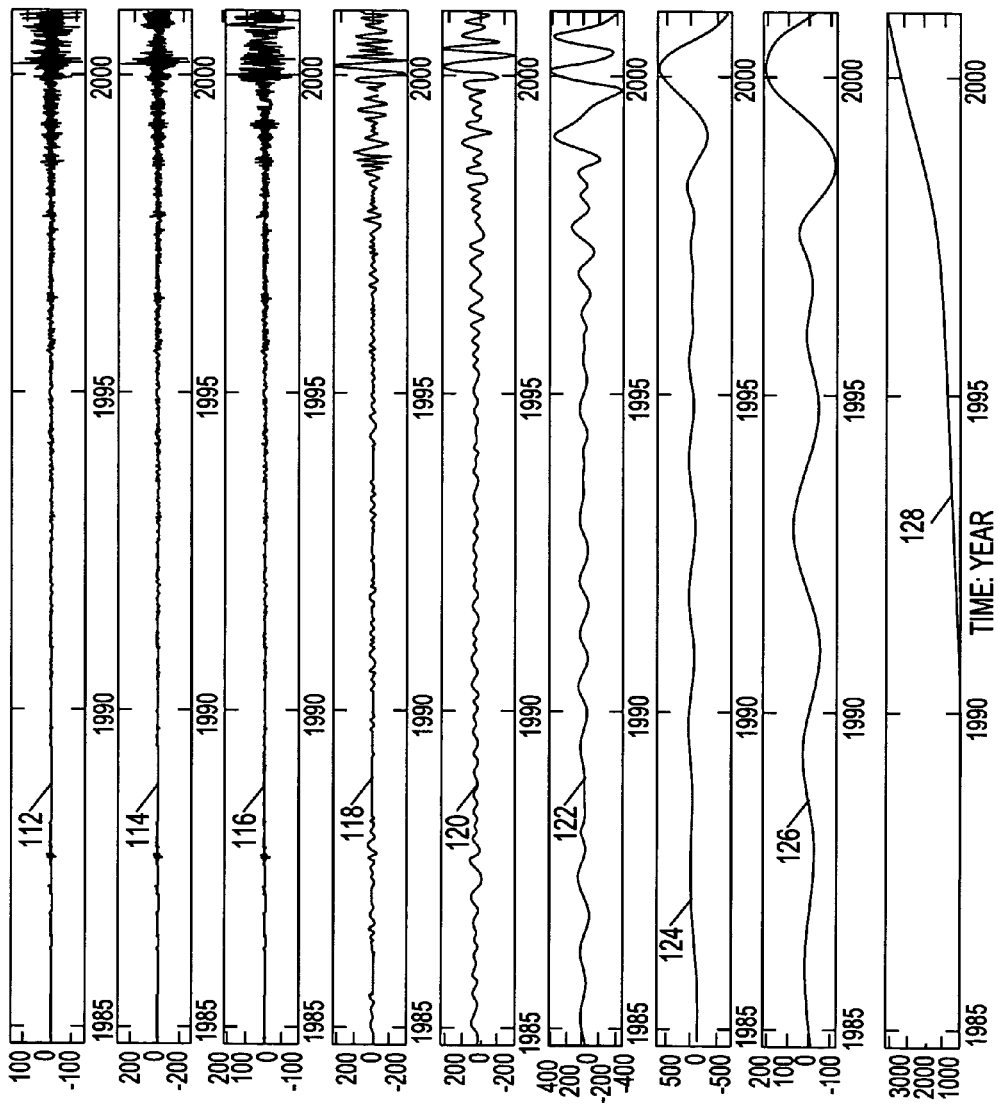

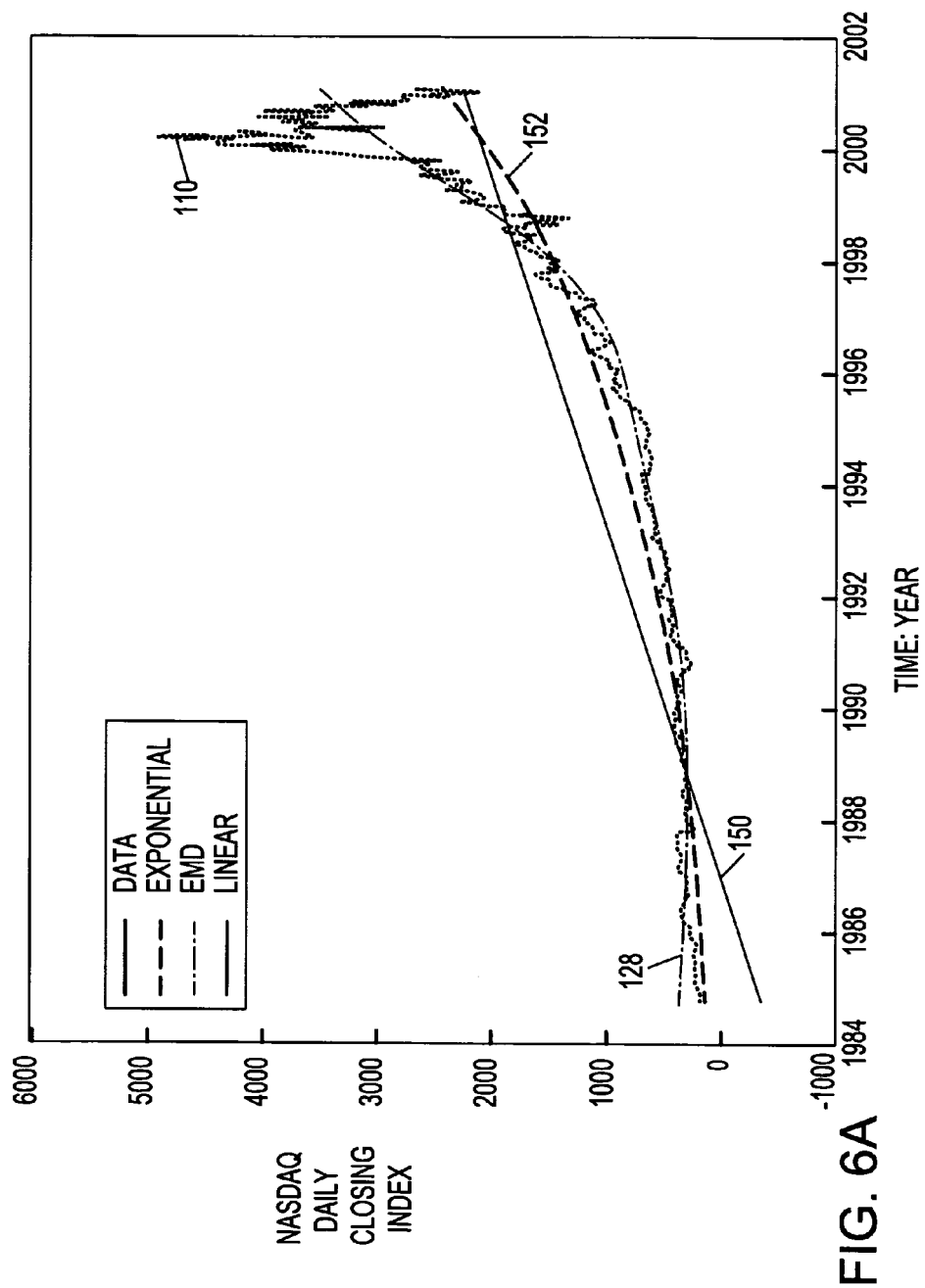

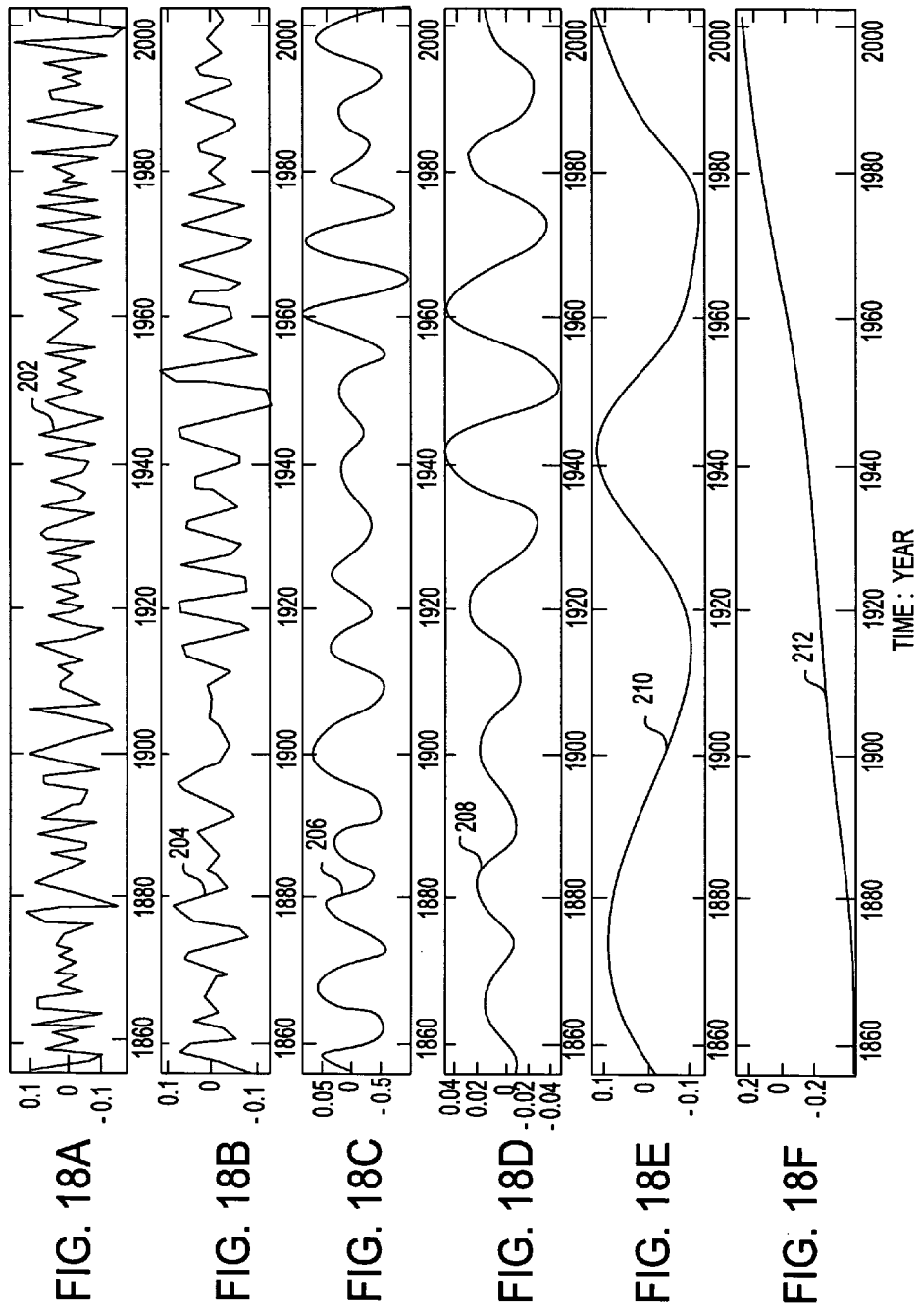

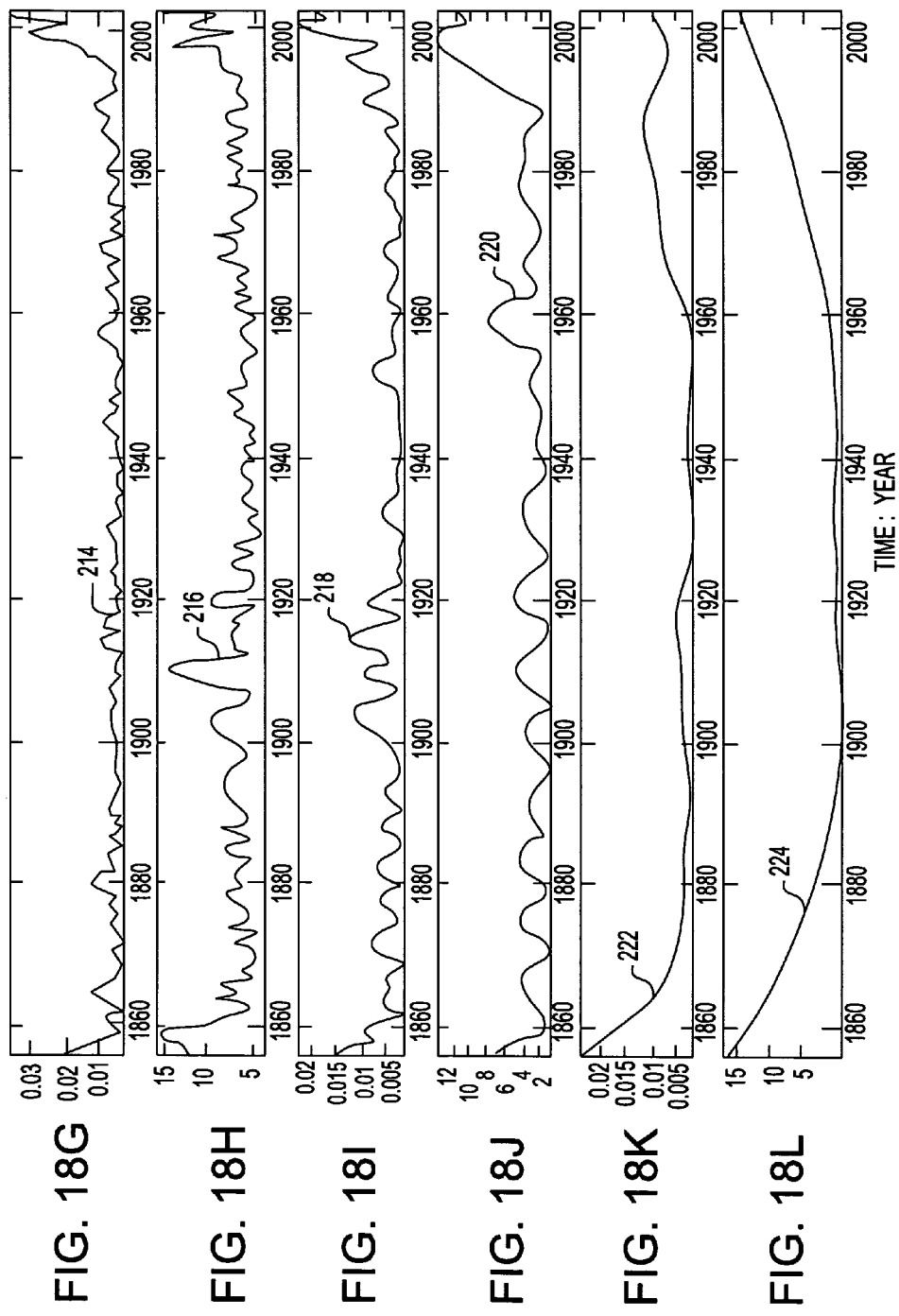

ANALYZING NONSTATIONARY FINANCIAL TIME SERIES VIA HILBERT-HUANG TRANSFORM (HHT)

CROSS REFERENCE TO RELATED APPLICATIONS

The present application is a continuation of U.S. Provisional Patent Application Ser. No. 60/510,678 filed Oct. 9, 2003 and related to U.S. Pat. No. 6,782,124 entitled "Three Dimensional Empirical Mode Decomposition Analysis Apparatus Method and Article of Manufacture" to Per Gloersen, assigned to the assignee of the present invention.

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Field of the Invention

The present invention is generally related to a data analysis method, apparatus and article of manufacture and more particularly to an apparatus, article of manufacture and analysis method for determining and extracting trends from nonstationary time varying data.

Although the present invention finds utility in determining and extracting trends from non stationary time varying data sequences such as financial and climatological data, it is understood that the present invention has application to any non stationary time varying data representative of real world phenomenon. For example, the real world phenomenon to which the invention finds utility may include any of a wide variety of real world phenomena such as population growth, traffic flow and, non stationary time varying data representative of processes including electrical, mechanical, biological, chemical, optical, geophysical or other process(es) that may be analyzed and thereby more fully understood by applying the invention thereto.

2. Background Description

Very often when large volumes of data are collected about real word processes, one of the first components analyzed is an apparently aperiodic component or, known as the data trend, e.g., "the markets are trending up." For a rigorous analysis of climatologic, financial, electric power consumption and/or inventory change data for example, identifying the trends is very important. Under some circumstances non-periodic terms (i.e., the trends) may overwhelm the result, e.g., in computing the correlation function and spectral analysis, for example. In these instances it is equally important to remove the trend or detrend the data before arriving at meaningful spectral results. Presently, because there is no precise mathematical definition for the aperiodic trend, trends are determined on a totally ad hoc basis.

Typically, the trend is selected as the result of a moving mean, a regression analysis, a filtered operation or simple curve fitting with an a priori functional form. These trend approximations are all subjectively determined based on certain idealized assumptions. Furthermore, normally, the data is not detrended using the same trend approximation. Instead, a typical trend determining method using a simple linear function or straight line base is selected to define a detrend zero reference and the data is rezeroed by removing the reference.

Since especially for non-linear and non stationary data, the source of the particular trend is the very same mechanisms that generated the data, neither the trend approximation nor detrended data is particularly accurate. Consequently, approximating the trend using a linear fitting or with a moving mean makes little sense where the underlying mechanism is certainly nonlinear, non stationary and may lack a definitive time scale, e.g., for real world phenomena such as data from climatologic studies and financial data.

Similarly, typical regression analysis and/or filtering are based on stationarity and linearity assumptions that may fit the data well, even for nonlinear regressions. However on a more fundamental level, a fortuitous regression analysis and/or filtering fit for particular data, does not justify applying a particular regression formula globally as a time independent function. Thus, these various prior art curve fitting approaches use an a priori determined functional form that does not necessarily match the trend to the same underlying mechanisms, i.e., those that are inherent in the data. For example, financial data analysis pioneers, R. F. Engle and C. W. J. Granger produced market prediction models that are useful for a special class of non stationary processes. Engle and Granger treated the financial market as a special Auto-Regressive-Integrated-Moving-Average (ARIMA) process that is controlled by a series shocks and relaxations. Of course, as Engle and Granger have acknowledged, not all non stationary data satisfies their special assumptions. So, regardless of the fit, it is very likely that the selected trend has a simplistic functional form that may not support the underlying mechanisms. Unfortunately, suitable analysis methods are not available for the vast majority of data from non stationary and nonlinear signal.

Thus, there is a need for a general method for identifying and determining trends from non stationary data and further, for detrending and determining the variability of such non stationary data. There is especially a need for a way to determine the trend and to detrend data from non stationary and nonlinear processes that do not rely on extrinsic functional or simplifying assumptions.

SUMMARY OF THE INVENTION

It is an aspect of the invention to define the trend for non stationary and nonlinear signals;

It is another aspect of the invention to intuitively and directly determine a precisely defined trend in any data including non stationary time varying data;

It is yet another aspect of the invention to extract the trend from non stationary and nonlinear data signals such that the trend is defined by the same mechanisms from which the data are collected;

It is yet another aspect of the invention to extract a trend that is an intrinsically fitted monotonic function within a data span, or a function in which there can be at most one extremum;

It is yet another aspect of the invention to detrend non stationary time varying data simply by removing an intrinsically determined trend and to determine the variability of the data after trend removal.

The present invention relates to an apparatus, computer program product and method of analyzing non stationary time varying phenomena. A representation of a non stationary time varying phenomenon is recursively sifted using Empirical Mode Decomposition (EMD) to extract intrinsic mode functions (IMFs). The representation is filtered to extract intrinsic trends, e.g., by combining a number of IMFs. The intrinsic trend is inherent in the data and identifies an IMF indicating the variability of the phenomena. The trend also may be used to detrend the data.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A-I show the IMF components extracted from the from the NASDAQ data of FIG. 3 using CE(1000,5);

FIGS. 6A-B show a comparison of the intrinsically derived trend for the NASDAQ data with trends derived according to prior art methods and the same data detrended using those prior art trends;

FIGS. 18A-L show mean IMFs and the standard deviation of IMFs from each of ten different sets of sifting criteria, for the S from 4 to 13;

DETAILED DESCRIPTION OF PREFERRED EMBODIMENTS

Computer for Implementing Preferred Embodiment Methods

Figure 1:
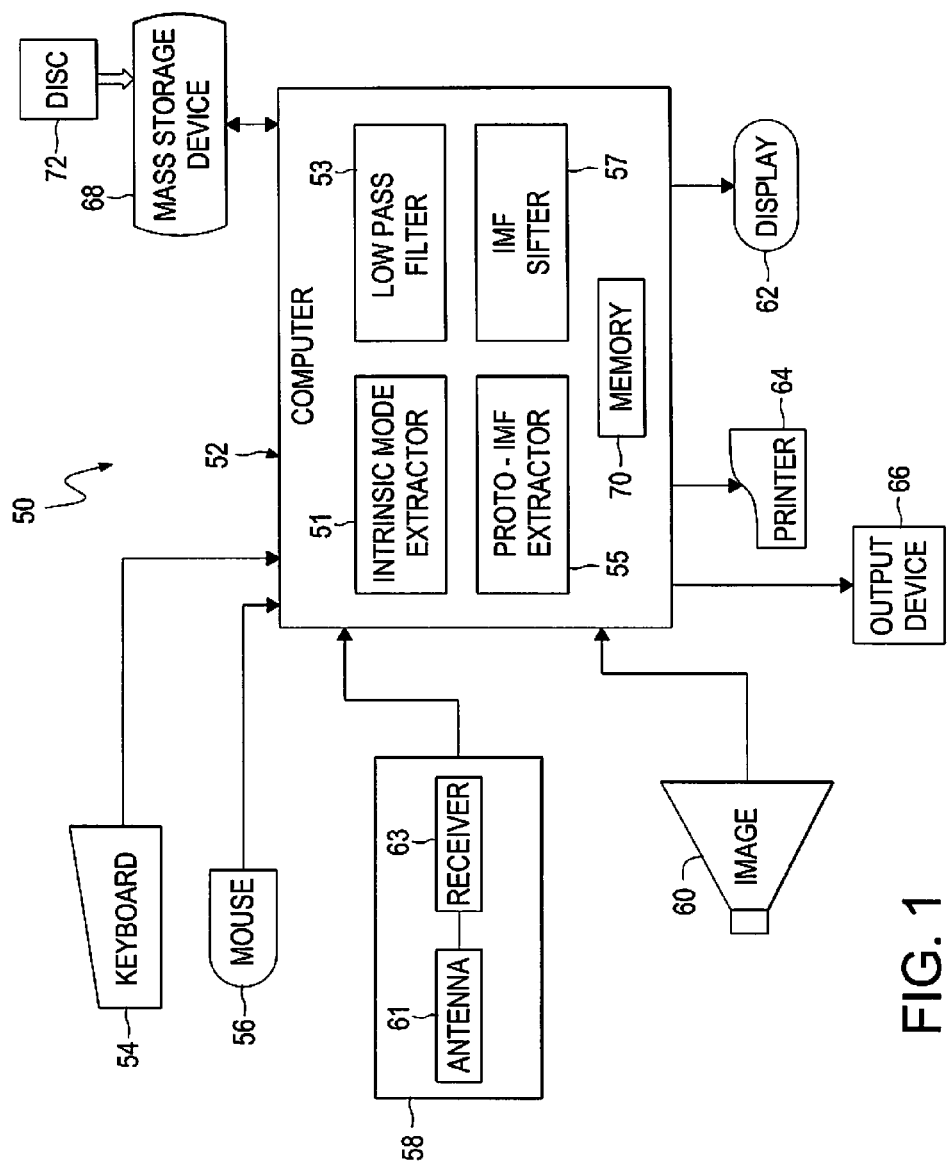
FIG. 1 shows a block diagram example of a computer system including a computer suitable for programming with the inventive method.

Turning now to the drawings and, more particularly, FIG. 1 shows a block diagram example of a computer system 50 including a computer 52 suitable for programming with the inventive method. The computer system 50 may include a keyboard 54 and mouse 56 for human interaction. When programmed with the inventive method, the computer 52 is analogous to an electrical filter or a mechanical sieve: it separates digital non stationary time varying signal data into series of Intrinsic Mode Functions (IMFs) according to their time scales. The digital data are filtered in a manner analogous to electrically filtering harmonics or a mechanical sieve which separates aggregated sand particles according to their physical size. An IMF represents an oscillation mode embedded in the data, as defined by the zero-crossings and involves only one mode of oscillation.

Each IMF satisfies the following two conditions: (a) the number of extrema and the number of zero-crossings must either be equal or differ at most by one within the data, and (b) at any point, the mean value of upper envelope defined by the maxima and the lower envelope defined by the minima is zero. In other words, each IMF represents only one group of oscillation modes or time scales and no riding waves are allowed in an IMF. The first IMF condition is somewhat similar to the traditional narrow band requirements for a stationary Gaussian processes. Conceptually, the second condition modifies the classical global requirement to a local one. Furthermore, the second condition has the desirable result that the instantaneous frequency will not have unwanted fluctuations induced by asymmetric wave forms. Mathematically ideally, the second condition should be "the local mean of the data being zero." For nonstationary data, a local time scale is necessary to compute the mean, which is otherwise impossible to define. Fortunately, the present invention obviates the need for defining a local time scale to fulfill the second condition. When applied to non stationary time varying signals to extract IMFs (e.g., from financial data representative of the daily NASDAQ index or geophysical data representative of annual global surface air temperature anomalies) trends are automatically identified and may further be removed to detrend the data.

Thus, for application to non stationary time varying data, the local mean of the signal envelopes are used to force the local symmetry. The signal envelopes are defined by the local maxima and the local minima. This approximation avoids defining a local averaging time scale. With the preferred physical approach and approximation, an instantaneous frequency is extracted under most conditions. Moreover, even under the worst case conditions, the instantaneous frequency so defined is still consistent with the nature of the system or phenomenon being studied and represents the system or phenomenon much more accurately than prior techniques such as those based on Fourier analysis.

To facilitate analyzing non stationary time varying signals, the computer system 50 also includes an input device 58, and/or an imaging device 60, e.g., for collecting image information on a physical phenomenon and generating non stationary time varying data representative thereof. Input device 58 may include an antenna 61 connected to a receiver 63 for receiving transmitted data, for example, from the trading floor, or a remote weather station for climatological studies. The computer 52 may include an intrinsic mode extractor 51, a low pass filter 53, a proto-IMF extractor 55 an IMF sifter 57 and memory 70. Similarly, the computer system 50 also may include a display 62 or other output device such as a cathode ray tube or flat panel display, a printer 64 and any other suitable output device 66. Each of these outputs (62, 64, 66) maybe capable of generating or otherwise handling color outputs because, for example, the Hilbert Spectrum may be in color. The generalized output device 66 may also be connected through a network to the computer 52, e.g., in a local area network (LAN) or a wide area network (WAN). In this way, the non stationary time varying signals may be inputted from/transferred to the network. Thus, all outputs can be sent between remotely connected locations over such a network connection.

Additionally, the computer system 50 also may include a mass storage device 68. The mass storage device 68 may be a hard disk, floppy disc, optical disc, etc. The mass storage device 68 may be used to store a computer program that performs the preferred method when loaded into the computer 52. More particularly, a computer program embodiment of the invention may be loaded from the mass storage device 68 into the internal memory 70 of the computer 52. Loading the computer program embodiment transforms the general purpose computer 52 into a special purpose machine that implements the invention. Even more particularly, each step of a preferred embodiment method may transform at least a portion of the general purpose computer 52 into a special purpose computer module implementing that step. For example, when a sifting step is implemented on the computer 52, the result is a computer implemented sifting apparatus (sifter) that performs the sifting functions of sifting step. Alternatively to storing the computer program embodiment locally, the input device 58 may be connected through a network connection to off-line storage that supplies the computer program to the computer 52.

Other preferred embodiments of the invention include firmware embodiments and hardware embodiments wherein the inventive method is programmed into firmware (such as EPROM, PROM, flash memory or PLA) or wholly constructed with hardware components. Constructing such firmware and hardware embodiments of the invention would be a routine matter to one of ordinary skill using known techniques.

Article of Manufacture

Still further, the invention disclosed herein may take the form of an article of manufacture, e.g., disc 72 in FIG. 1. More specifically, the article of manufacture may be any computer-usable medium, including a computer-readable program code embodied therein wherein the computer-readable code causes computer 52 to execute the inventive method. Examples of such a computer-usable medium 72 include a CD-ROM, a DVD-ROM, high density moveable storage, flash memory storage or a computer diskette. When the contents of the disc 72 are loaded into the mass storage device 68, the computer-readable program code stored therein is transferred into the computer 52. In this way, the computer 52 may be instructed to perform the inventive methods disclosed herein.

METHOD FOR CARRYING OUT THE INVENTION

Rather than an extrinsically determined parameter, as defined herein, the trend is an intrinsic data property and part of the signal generating the data and is the residue determined by this Empirical Mode Decomposition (EMD). For a suitable example of EMD to determine IMFs and residue, see U.S. Pat. No. 5,983,162 entitled "Computer Implemented Empirical Mode Decomposition Method, Apparatus, and Article of Manufacture" issued Nov. 9, 1999 to the assignee of the present invention and incorporated herein by reference. See also, U.S. Pat. No. 6,782,124 entitled "Three Dimensional Empirical Mode Decomposition Analysis Apparatus Method and Article of Manufacture" issued Aug. 24, 2004 to Per Gloersen and assigned to the assignee of the present invention and incorporated herein by reference. The same mechanisms that generate the observed signal or measured data drive the intrinsic trend. More specifically, for an observed signal a trend exists only within a given data span (i.e., is temporally local) and is an intrinsically fitted monotonic function for that given data span (within the time of the data span), or a function in which there can be at most one extremum within the span. Accordingly, the trend is temporally local and defined with reference to local time ranges, i.e., a local length, scaled in terms of data length. Further, the trend defined according to a preferred embodiment of the present invention has a more general meaning than the overall residue, because various local scales can be selected from within the data that clearly define a local trend.

A definite local time scale must be determined in financial data, for example, to meaningfully model most financial systems. Similarly, although it is important for societal and economical reasons to identify climatological trends, for example, such data typically is fraught with inherent time scaling variability. However, once intrinsic local periods or scales are defined, local trends may be extracted and the data may be subjected to meaningful analysis within the defined local scales. Thus, according to a preferred embodiment of the present invention, trends may be defined for any time series signal with varying local time scales, as long as a time scale may be defined within which the trend exists logically. Once the trend is defined, the data may be detrended simply by removing the trend and the variability can be extracted.

Figure 2A:
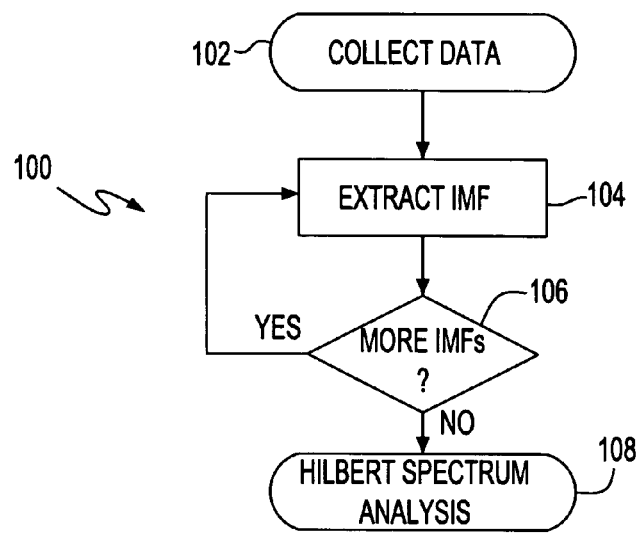
FIG. 2A shows a flow diagram example of iteratively extracting IMFs for any collection of data (X(t))

Generally, as can be seen from the flow diagram example of FIG. 2A, a non stationary time varying signal that may be non-linear is subjected to the Hilbert-Huang Transform 100 to extract intrinsic trends and variability data from the signal and, optionally detrend the signal. So, for any collection of data 102 representing the non stationary time varying signal (X(t)), IMFs are iteratively extracted 104, 106. Essentially, each IMF represents a single oscillation mode embedded in the data, defined by zero-crossings. In step 108, the EMD components are subjected to Hilbert Spectral analysis to adaptively extract and derive trends and variability from the data and, also detrend the data according to a preferred embodiment of the present invention. This is in contrast to prior art approaches, which typically define an extrinsic trend, selected for example, using pre-selected simple functional forms and time periods. Moreover, the intrinsic trend can be selectively locally valid within part of data, i.e., less than a full local wavelength. Where there were two or more extrema of the same sense, the data may represent a cycle instead of a trend. Thus, the present invention avoids the well known confusion in that "one economist's 'trend' can be another's 'cycle.'"

Figure 2B:
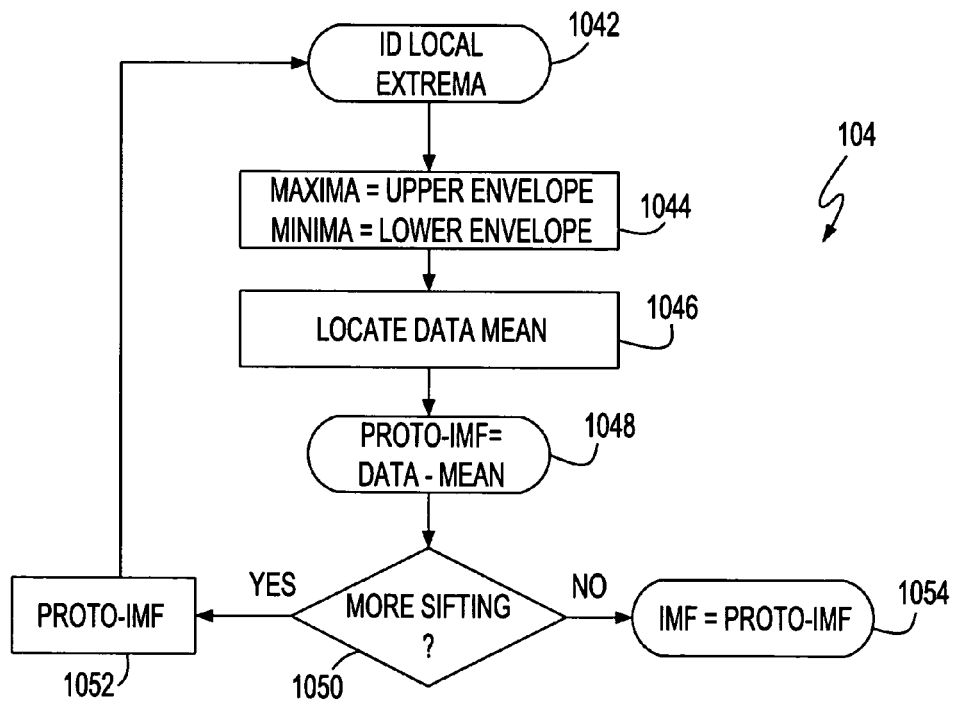
FIG. 2B shows a flow diagram example of extracting each IMF.

FIG. 2B shows a flow diagram example of extracting IMFs in step 104 according to a preferred embodiment of the present invention. As indicated hereinabove, each IMF satisfies the following two conditions: (a) the number of extrema and the number of zero-crossings must either be equal or differ at most by one within the data, and (b) at any point, the mean value of the upper envelope defined by the maxima and the lower envelope defined by the minima is zero. In other words, each IMF represents only one group of oscillation modes or time scales and no riding waves may be included in an IMF. It should be noted that each of these local time scales are the bounds of a temporally local trend.

So, beginning in step 1042 local extrema are identified in the signal X(t) or the partially decomposed signal $X_i(t)$, i.e., after at least one has been removed. Then, in step 1044 the signal envelope is marked at the signal extrema to identify local maxima which defines an upper envelope edge and local minima which defines a lower envelope edge. Each edge may be identified independent of or simultaneously with the other. In step 1046 the mean (designated as $m_i$) of the envelope is determined as the mean of the upper and lower edges. In step 1048 as the difference between the data or partially sifted data and the mean from step 1046 determines a proto-IMF ($h_i$), i.e., $X_i(t)-m_i=h_i$. Since with each IMF extraction, previously hidden data characteristics may become more pronounced and so, become a local extremum, the proto-IMF is checked in step 1050 to determine if additional sifting has become apparent after each extraction. If additional data characteristics must be removed, then the proto-IMF is treated as the data in step 1052 and local extrema are identified in step 1042. Ideally, however, the proto-IMF, $h_i$, is the IMF in step 1054. Thus, in step 104 of FIG. 2A, sifting is repeated until no IMFs remain to be extracted, i.e., the remaining data contain only one extremum and is the residue defining the overall trend.

It is this sifting of the proto-IMFs that eliminates riding waves and is necessary for separating the final IMFs 1054 and for defining a meaningful instantaneous frequency. Further, since the riding waves are eliminated, the wave profiles are symmetric, which may be necessary if the disparity between neighboring wave amplitudes is too large. So, the proto-IMF is repeatedly sifted as many times as necessary to eliminate any remaining riding waves and improve IMF symmetry. This repeated sifting may be used to reduce the extracted signal from a proto-IMF to an IMF by treating each proto-IMF as the data, and then, applying $$h_i-m_{i1}=h_{i1}$$

used repeatedly sifting up to k times to yield $$h_{i(k-1)}-m_{ik}=h_{ik},$$

where $h_{ik}$ is the $i^{th}$ IMF component designated as $c_i=h_{ik}$. Overall, $c_i$ should contain the finest scale or the shortest period component of the sifted signal and the first component, for example, can be separated from the rest of the data by $$X(t)-c_i=r_i, \text{ and generally thereafter,}$$

$$r_{i-1}-c_i=r_i, \text{ and in summary for n components,}$$

$$X(t) = \sum_{i=1}^{n} c_i + r_n.$$

Each of these empirical mode components usually is physically meaningful within characteristic scales that are self-defined by the physical data and the residue $r_i$ defines the trend within those characteristic scales. As long as the residue, $r_i$, contains periodic components in step 106 of FIG. 2A, it is treated as the data and sifted in step 104 as described above with reference to FIG. 2B until all of the components have been removed. The overall trend $r_n$ is the last extracted component and is identified when sifting produces a constant, a monotonic function or a function with only one maximum and one minimum from which additional IMFs cannot be extracted. Since even if the data X(t) has a zero mean, its final residue may be non zero and the final residue defines the overall trend. Thus, the signal X(t) decomposes into n-empirical mode components including IMF components $c_i$ and the final residue $r_n$. These EMD components ($c_i$) are subjected to Hilbert Spectral Analysis in step 108 to derive trends and variability from the data and, also optionally detrend the data according to a preferred embodiment of the present invention.

Figure 2C:
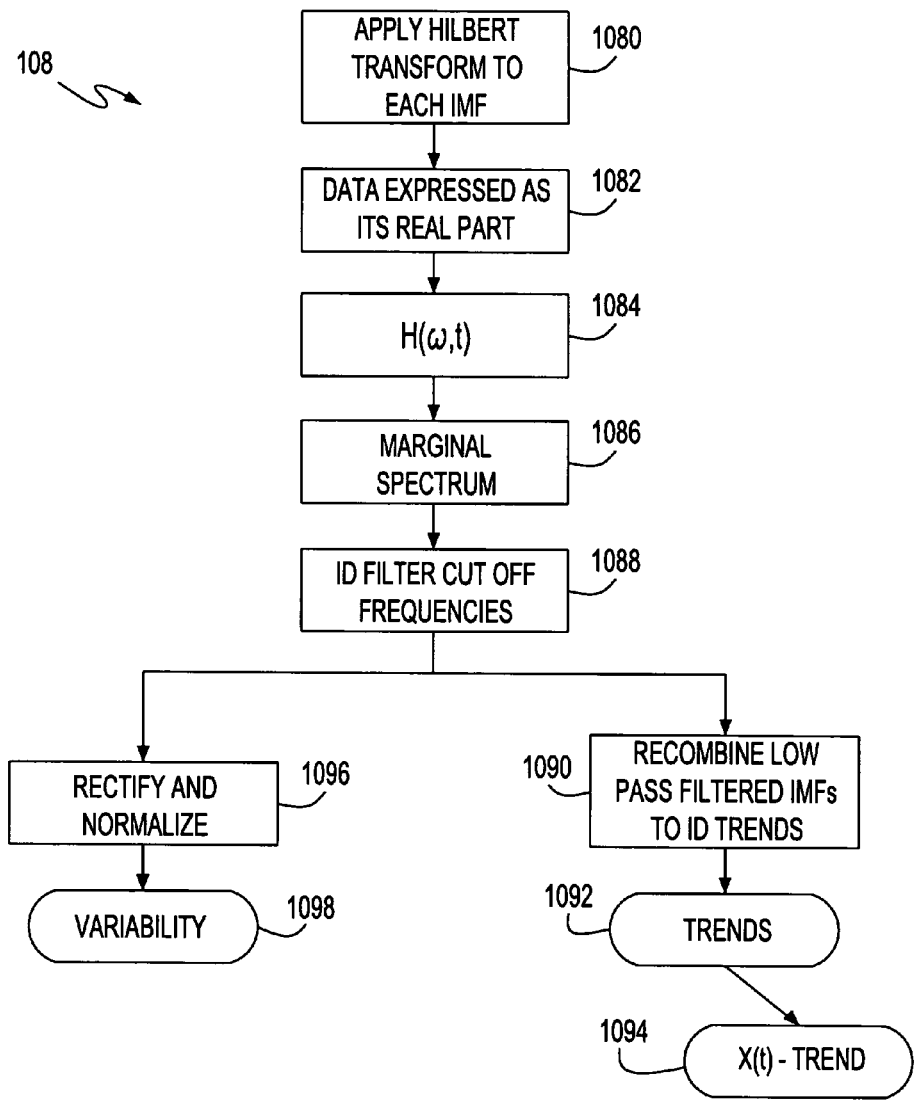
FIG. 2C shows an example of Hilbert Spectral Analysis to derive trends and variability from the data and, also optionally detrend the data.

FIG. 2C shows an example of the Hilbert Spectral Analysis step 108 to derive trends and variability from the data and, also optionally detrend the data. First in step 1080, the Hilbert Transform is applied to each component ($c_i$). Then, in step 1082, the data are expressed as a real part. In step 1084, the Hilbert Spectrum is extracted from the real part. In step 1086, the marginal spectrum is extracted from the Hilbert Spectrum. In step 1088 variability and trend filtering frequencies are identified from the spectrum data. In step 1090, the signal is low passed filtered recombining a number of lower frequency components with the final residue $r_n$ to generate intermediate trends 1092 which are either a constant or monotonic function. Optionally in step 1094, the trend 1092 may be subtracted from the signal to detrend the data. Similarly the cut off frequency identified in step 1088 identifies corresponding IMF components that indicate the variability of the signal at those trends. So, optionally in step 1096 the corresponding IMF components may be rectified by taking the absolute value of the IMF and, normalized to the original signal. Thus, the corresponding IMF components, optionally rectified and normalized, are the corresponding variabilities 1098.

In step 1080 the Hilbert transform, Y(t), is computed and applied to each IMF component to compute the instantaneous frequency in, i.e., applying Hilbert spectral analysis to EMD. In particular, the Hilbert transform, which is the convolution of X(t) and 1/t, has the form:

$$Y(t) = \frac{1}{\pi} P \int \frac{X(t')}{t-t'} dt'.$$

where P is the Cauchy principal value. The Hilbert transform emphasizes the local component of X(t), even though the transform is global. It is well known that the Hilbert transform exists for all functions of $L^P$ class and so, X(t) and Y(t) form a complex conjugate pair of an analytic signal, Z(t). In polar coordinates:

$$Z(t)=X(t)+iY(t)=a(t)e^{i\theta(t)}, \text{ where}$$

$$a(t)=[X^2(t)+iY^2(t)]^{1/2};$$

$$\theta(t)=\arctan(Y(t)/X(t)).$$

The polar coordinate expression further clarifies the local nature of this representation, providing a local fit of an amplitude and phase varying trigonometric function to X(t). Using the Hilbert transform, the instantaneous frequency may be defined as:

$$\omega(t)=d\theta(t)/dt.$$

So, once the Hilbert transform is obtained for each IMF, in step 1082 the original data can be expressed as the real part, RP, having the form:

$$X(t) = RP\sum_{j=1}^{n} a_j(t)e^{i\int \omega_j(t)dt}.$$

The Hilbert transform yields both an amplitude and frequency of each component as functions of time and has an energy that is the component's Hilbert Amplitude Spectrum, $H(\omega,t)$, in time-energy-frequency space or, simply, its Hilbert Spectrum in 1084. Although the final residue (the trend, $r_n$) has been omitted, if physical considerations justify inclusion, the Hilbert transform can treat the monotonic or constant trend as part of a longer oscillation. However, normally, it is omitted to avoid the possibility that energy in the residual trend would overpower the rest of the spectrum. In particular any benefit derived from including the trend component seldom outweighs the uncertainty introduced by any increase in the time period to include the trend. Further, normally, interest lies in oscillatory components including the information contained in the other low energy but clearly oscillatory components.

It should be noted that expanding the same signal in a Fourier series representation has the form:

$$X(t) = RP\sum_{j=1}^{\infty} a_j e^{i\int \omega_j dt}$$

with both $a_j$ and $\omega_j$ term being constants rather than time dependent functions. So, the IMFs are a generalized Fourier expansion of the signal. In contrast to the constant value Fourier representation, the preferred embodiment IMF expansion including the above real part representation exhibits greatly improved efficiency with variable amplitude and instantaneous frequency components that accommodate nonlinear and nonstationary data. Further, the IMF expansion clearly separates amplitude from frequency modulations, overcoming the Fourier expansion restriction of selecting constant amplitudes and fixed frequencies to arrive at a variable amplitude and frequency representation in step 1084, i.e., the Hilbert Spectrum.

Further, to represent energy density, in step 1086 squared values of amplitude may be substituted to produce the Hilbert Energy Spectrum as well. However, for more quantitative results the skeleton Hilbert Spectrum may be presented. Additionally, two-dimensional smoothing (e.g., the Laplace Transform) may be applied to the skeleton for a "fuzzy" or "smeared" view. In particular, the total amplitude (or energy) contribution can be measured for each frequency in step 1086 using the marginal spectrum $h(\omega)$, which has the form $$h(\omega) = \int_0^T H(\omega, t)dt.$$

Generally, the marginal spectrum represents the cumulated amplitude over the entire data span in a probabilistic sense. From this representation, the areas of interest, e.g., changing trends and periods of intense variability, may be identified in step 1088.

It should be noted that, in particular, traditional signal filtering may be applied to the IMF components, especially for either nonlinear or nonstationary signals or both. Advantageously, filtering the IMF components from such signals that are both nonlinear and nonstationary avoids wave form deformation and distortion from inadvertently generated harmonics of all ranges including those outside of the filtering range and that prior art approaches have frequently encountered.

Accordingly where periods T of interest identified by the Hilbert spectrum peaks of a filtering point as the $k^{th}$, in step 1090 and 1094 the signal is easily filtered with standard time-space filtering, e.g., low pass filtering k of the n IMF components of the signal to extract a trend can be simply expressed as $$X_{lk}(t) = \sum_{k}^{n} c_j + r_n;$$

high pass filtering the first expressed as $$X_{hk}(t) = \sum_{1}^{k} c_j;$$

and band pass filtering expressed as $$X_{bk}(t) = \sum_{b}^{k} c_j.$$

Advantageously, time-space filtering according to a preferred embodiment of the present invention preserves the full nonlinearity and nonstationarity in physical space of each filtered signal including both the trend 1092 and the high passed filtered result of step 1094.

Optionally, the absolute value may taken of the high pass filtered result and normalized to the corresponding instantaneous signal X(t) and variability V(t;T) may be selected to have the form:

$$V(t;T) = \frac{|X_{hk}(t)|}{X(t)}.$$

Variability is somewhat different than the more traditional market analysis parameter of volatility. Instead, while variability 1098 is a function of time, it also is time scale dependent, i.e., dependent upon T. Further, variability 1098 is a simple and direct measure of the market volatility and is a unit free parameter because it is a normalized to the market value.

Once the trend 1092 is generated, detrending is a relatively simple operation. The data X(t) is detrended by subtracting the trend, i.e., $X(t) - X_{lk}(t)$.

Advantageously, intrinsic trends may be extracted for any non stationary time varying signal according to a preferred embodiment of the present invention and further, the relationship of the trend with the IMFs may be described. Moreover, the preferred embodiment trend identification approach also may be applied to determining various trends with nuanced time scales, including to real world non stationary time varying signals, such as financial data or climatological data. Thus, a better understanding and appreciation of the advantages and uses of the present invention may be achieved through specific examples provided hereinbelow of application to both financial data (e.g., the NASDAQ daily index) and climatological data (e.g., the annual global surface temperature data). It should be noted that in both specific examples, the data may not be representative of general principals, i.e., the daily NASDAQ index may not represent the dynamics of the financial market well; and, anomalies in the annual global surface temperature data may not portray climate change mechanisms clearly. However, data for these two real world phenomena are readily available and serve well to illustrate the present invention. The present invention has application to determining various trends with nuanced time scales in any type of data.

The Daily NASDAQ Index

Figure 3:
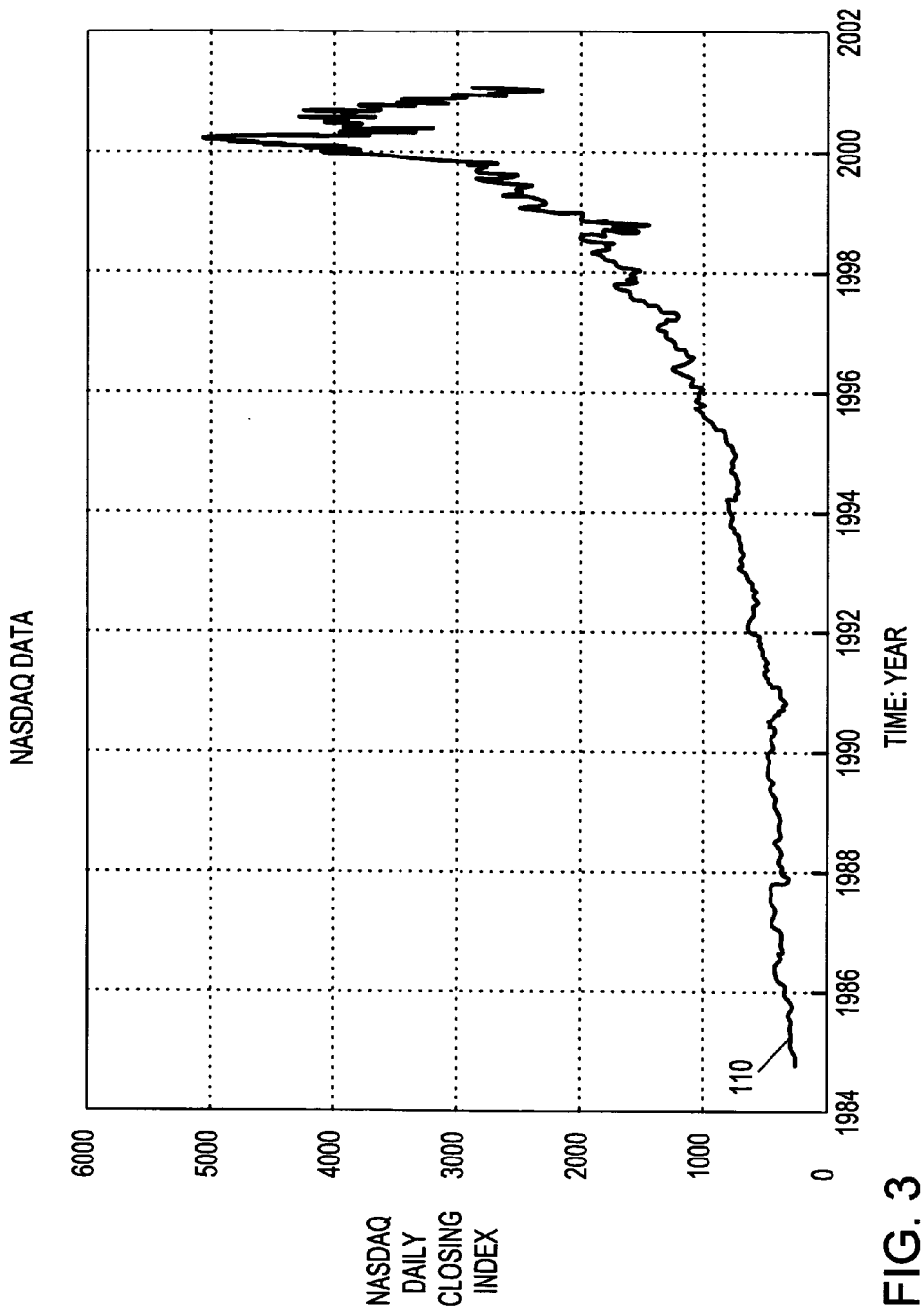
FIG. 3 shows the NASDAQ daily closing index value signal from its inception on 11 Oct. 1984 to 29 Dec. 2000.

So, for example, FIG. 3 shows the NASDAQ daily closing index value signal 110 from its inception on 11 Oct. 1984 to 29 Dec. 2000, a total of 4099 days. FIGS. 4A-I show the IMF components 112, 114, 116, 118, 120, 122, 124, 126, 128, respectively, extracted as described in FIG. 2B from the from the NASDAQ data of FIG. 3 using CE(1000,5) (extrema sifting with stoppage S number equal to 5 consecutive proto-IMFs, i.e., with same and equal number of extrema and zero-crossings). So, the overall trend in this example is the $9^{th}$ residue 128 of FIG. 4I.

Figure 5B:
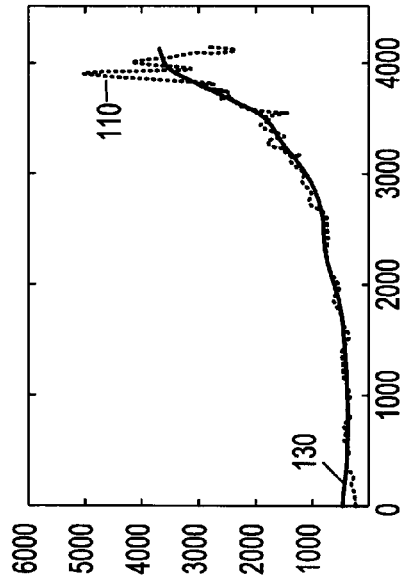
FIGS. 5A-H show recombining the IMF components to reconstitute the original data signal.
Figure 5D:
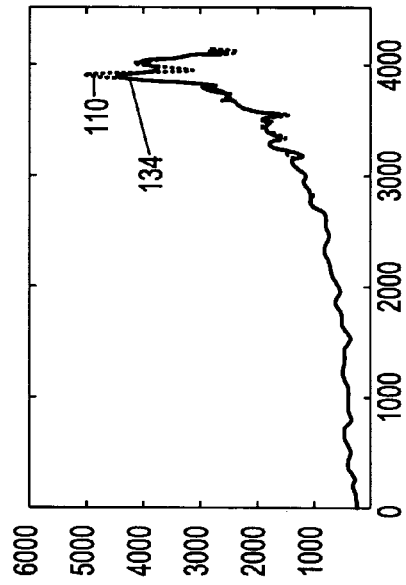
Figure 5A:
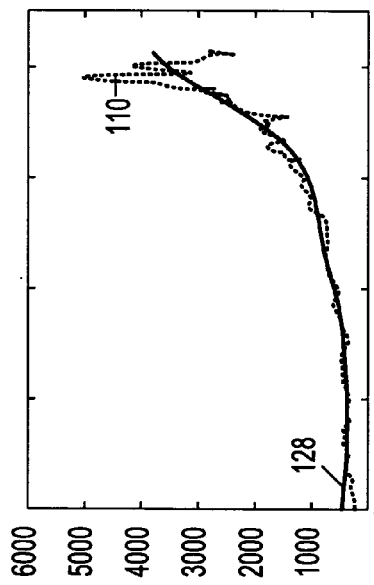

FIGS. 5A-H show step-by-step 130, 132, 134, 136, 138, 140, reconstituting the original data from the IMF components 112, 114, 116, 118, 120, 122, 124, 126, 128 of FIGS. 4A-I, with reference to the original signal 110. So, FIG. 5A shows the original signal 110 overlaying the trend 128. As each subsequent IMF component 126, 124, 122, 120, 118, 116, 114 is added, the reconstituted signal 130, 132, 134, 138, 140 approaches the original until the first IMF 112 is added to completely reconstitute the original 110 in FIG. 4H. Of course, the order in which the selected IMFs are combined 112, 114, 116, 118, 120, 122, 124, 126, 128 is unimportant as the result will be the same, i.e., the original signal 110.

Figure 6B:
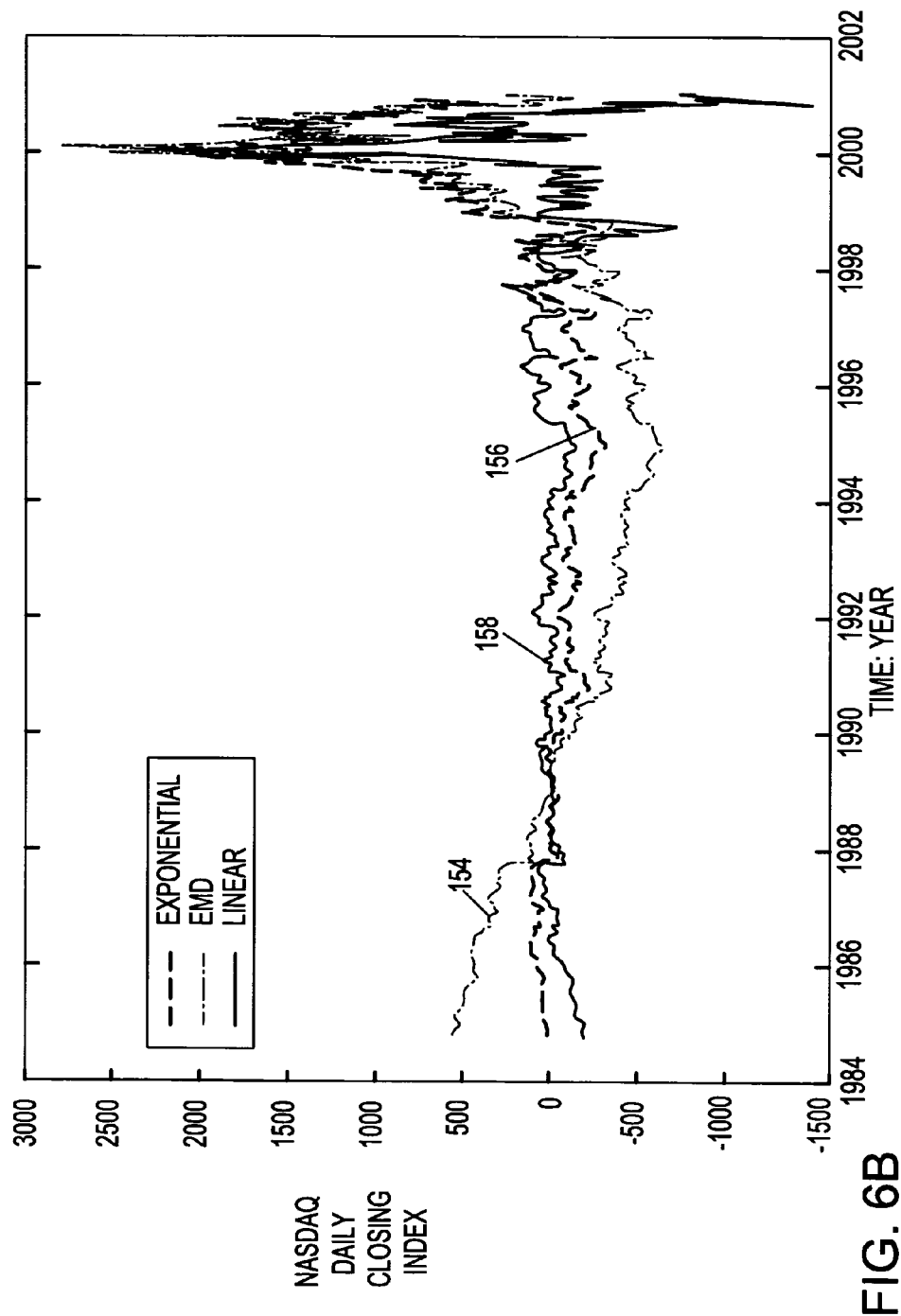

FIGS. 6A-B show a comparison of the intrinsically derived overall trend 128 for the NASDAQ data 110, derived according to a preferred embodiment of the present invention, with overall trends 150, 152 derived according to prior art methods; and detrended 154, 156 using those prior art overall trends 150, 152 and detrended 158 according to a preferred embodiment of the present invention. Thus, extrinsically determined trends 150, 152, which are determined linearly and exponentially, respectively, are compared with the final residue 128, which is the last IMF component of FIG. 4I, overlaying the original NASDAQ data signal 110. By comparison the intrinsically determined overall trend 128 provides much more valuable information and more closely predicts the signal for the whole data span. Further, comparing the detrended results of FIG. 6B shows that the traditional detrended data 154, 156 are much poorer results than preferred embodiment detrended data 158. It should be noted that typical current stock market models use an exponential fit 152, 156 which, although provides a much better fit than the linear fit 150, 154, still falls far short of the preferred embodiment EMD fit 128, 158. Similarly, the variability statistics of the fittings is much improved for a preferred embodiment detrending than from prior art methods. Specifically, it may be shown that the mean of the variability is zero for a linear fit, 73.1187 for an exponential fit and 0.3588 for a preferred EMD fit; and, the standard deviation of the variability is 559.09 for a linear fit, 426.66 for an exponential fit and 238.10 for a preferred EMD fit.

Further, it may be shown that using traditional polynomial curve fitting techniques, the NASDAQ data 110 may be modeled with a $4^{th}$ power polynomial. For one such polynomial model, the mean deviation is only −0.0079 and the standard deviation is 255.36, which is only slightly larger than 238.10 for the preferred EMD fit. It should be noted, however, that other than that this $4^{th}$ power polynomial is a better fit than either of the simple linear and exponential fittings, there is no other justification for its application to market, because there is nothing to indicate that such market data is time dependent or derived from time dependent processes that are fourth order functions of time.

Generally, the trend has meaning for the entire time period of interest, but is not particularly helpful in extracting other useful data. Short range trends over much finer time scales are necessary to determine meaningful temporally local parameters and behaviors, e.g., a weighted mean and a standard deviation. So, while the final residue 128 provides an overall trend for the total period for the signal 110, that may not be particularly useful for understanding and determining these local or short range trends. Short range trends within shorter time periods may be determined by identifying an upper bound of by the variability zero-crossings within the range of interest. In particular, the range or time scale may be determined by the time spans between a various combinations of the critical points defined as the union of all the zero-crossings and extrema.

So, for a particular time range, the most local time scale and also the finest resolution, is the distance between the neighboring critical points, i.e., between an extrema to the next zero-crossing. Next within the same time range is a half wave cycle, i.e., the time either between two consecutive extrema (a minimum to the next maximum), or between two consecutive zero-crossings (up zero-crossing to a down-zero-crossing). The full wavelength is the longest time scale within the time range and is also the most physical time scale. The full wavelength may be measured from one maximum (minimum) to the next maximum (minimum), or one up (down)-zero-crossing to the next up (down)-zero-crossing. Thus, for any given time range, a number of local time scales may be determined for representing different temporally local properties, i.e., within that given time range.

Figure 7A:
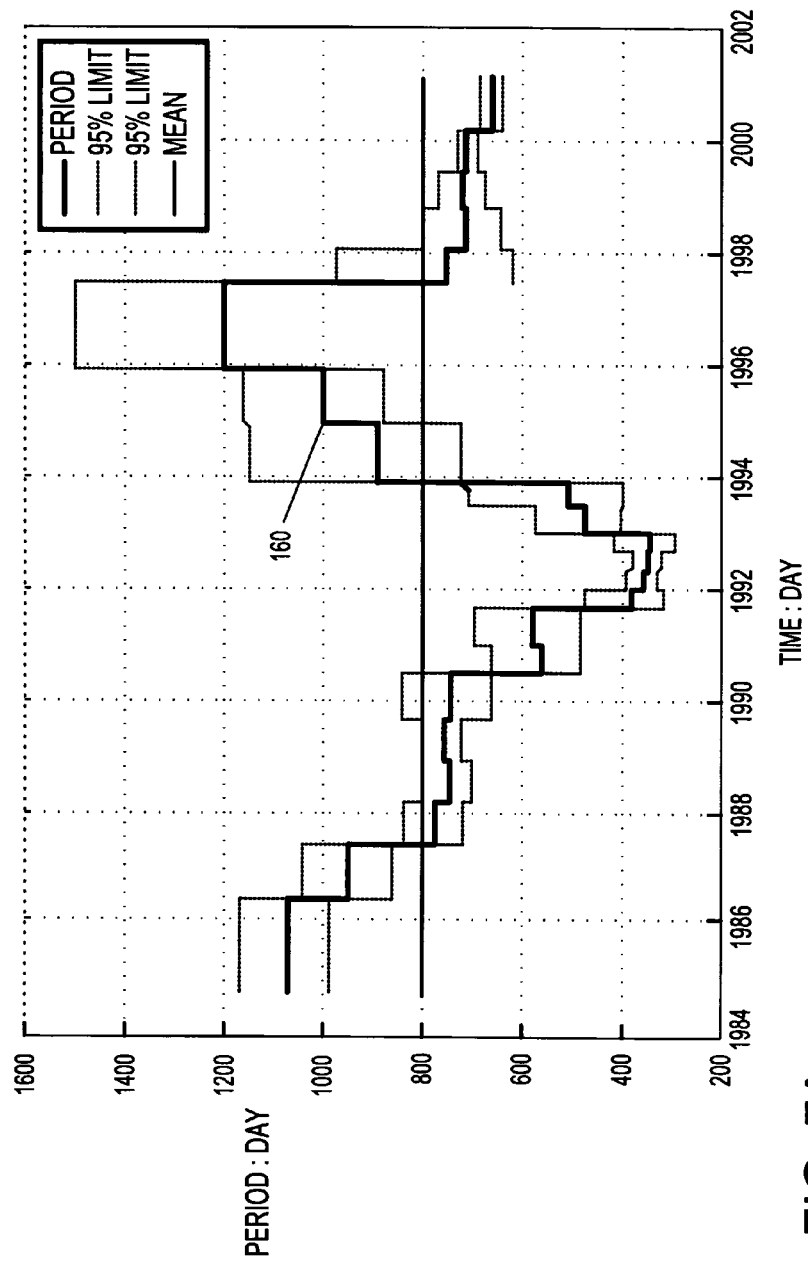
FIGS. 7A-D show identified temporally local time periods for partially reconstructed signals.

FIGS. 7A-D show the local periods for partially reconstructed or low pass filtered signals. Combining the last two IMF components (126, 128 in FIGS. 3H and I as shown in FIG. 5B) improved data fit over the overall trend (FIG. 5A) because as can be seen in FIG. 7A, the filtered signal has an associated time varying period 160 that is much finer than the overall trend 128. Instead, a local trend may be identified in each of these periods. Further, the time varying period 160 varies between 400 to 1200 days with a mean at near 800 days, based on the local data variability rates, which is an indication of the dynamics of the market. Accordingly, the mean value, which is 796.6 days or nearly 4 years (there are only 200 trading days in each year), might be considered meaningless for this data. However, using the mean value as a guide for the overall time scale, this four-year cycle is coincides with the time scale of the presidential election. This same four-year cycle has also appeared in the 30 years mortgage interest rate studies. Thus, as might otherwise be expected, it appears possible/likely from FIG. 7A that politics influences the financial market.

Figure 5C:
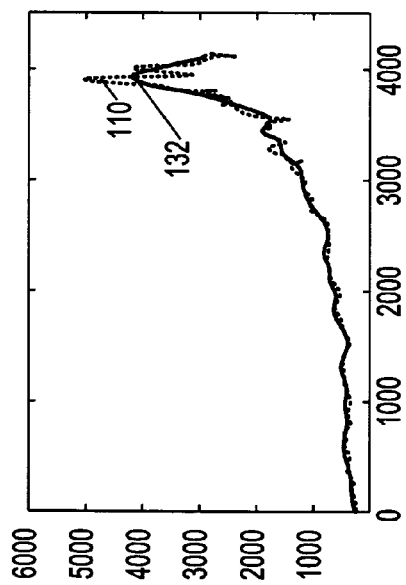
Figure 5F:
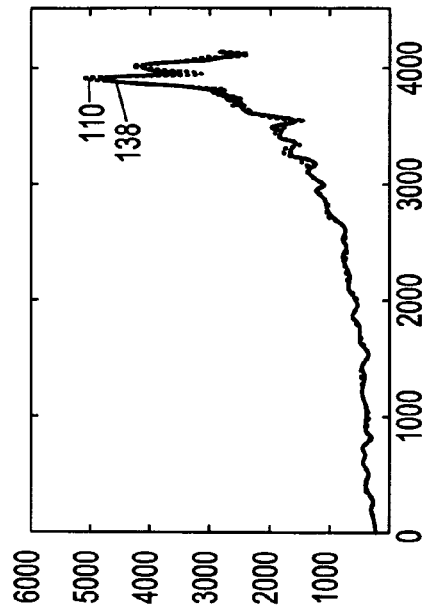
Figure 5H:
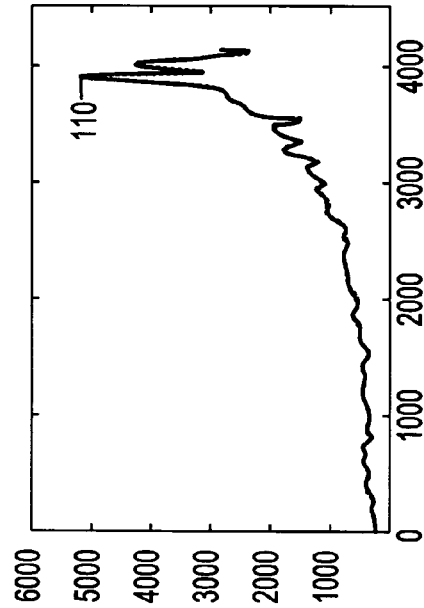
Figure 5E:
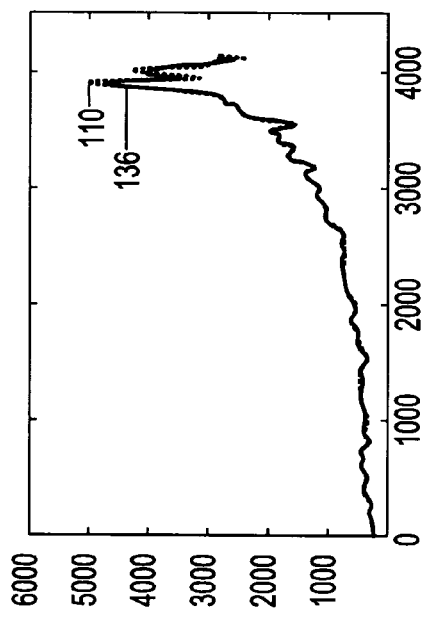
Figure 5G:
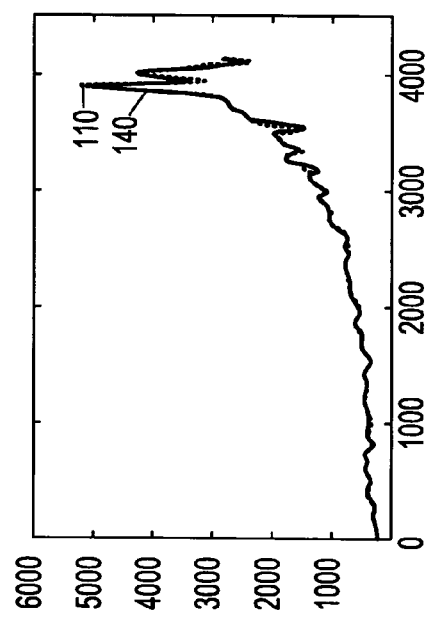
Figure 7B:
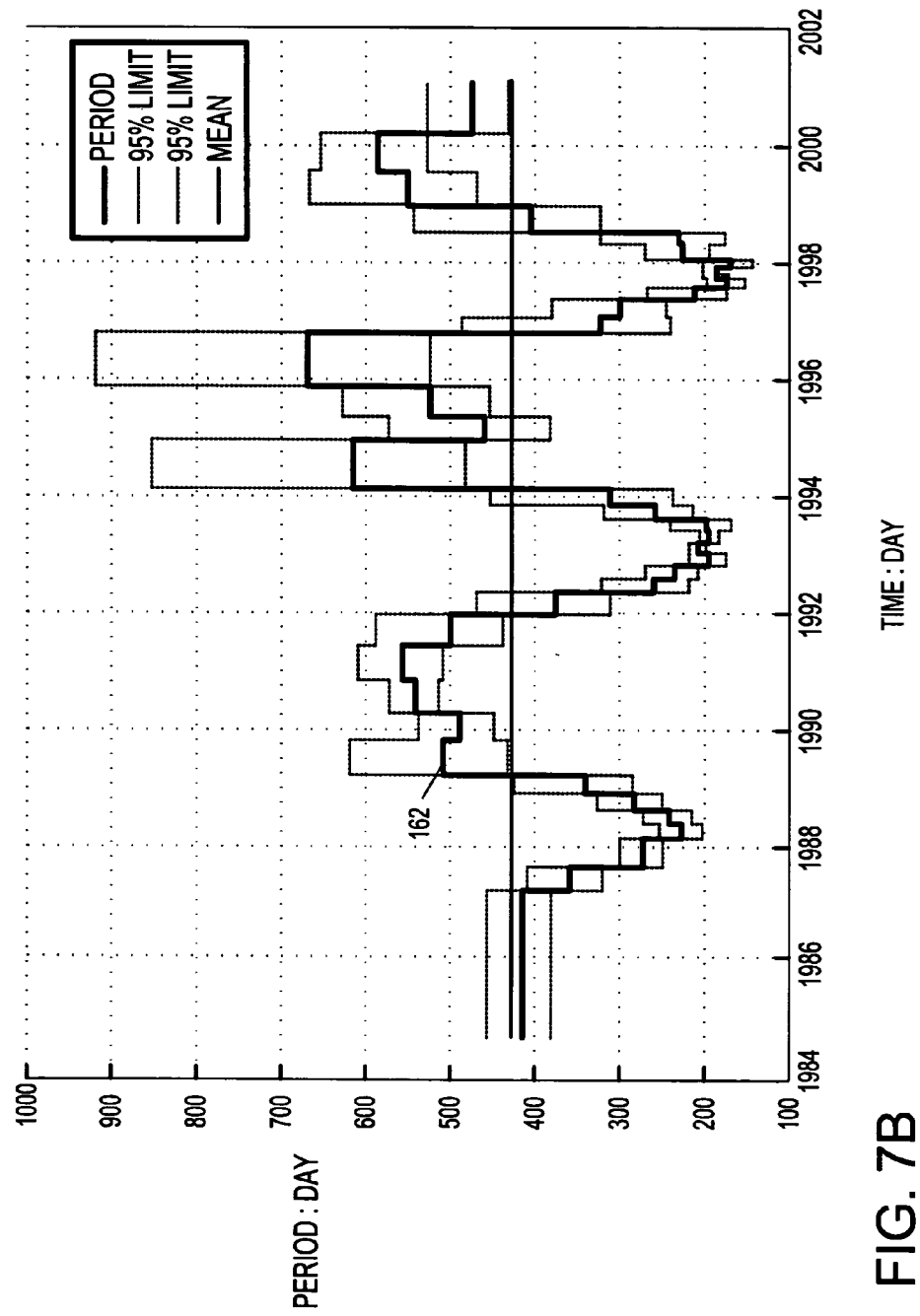
Figure 7C:
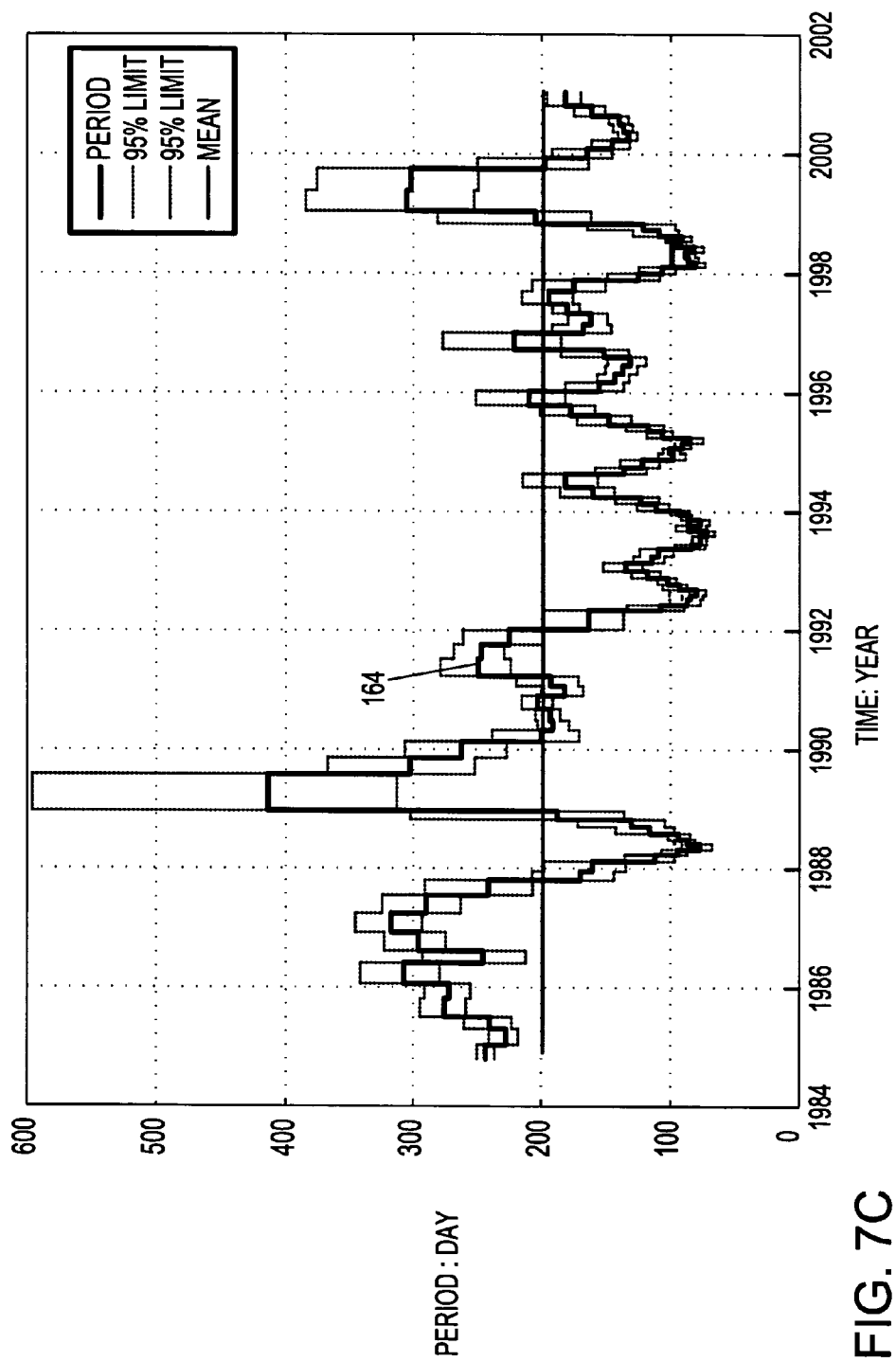

Similarly, in FIG. 7B, local trends can be defined for finer periods by opening the low pass filter slightly, including the last three IMF components 124, 126, 128 for an even better data fit of the as shown in FIG. 5C. In this example, the local period 162 varies between 200 to 600 days, with a mean of 425.7 days or slightly over two years. Likewise, the local period 164 of FIG. 7C with the low pass filter including the last four IMF components 122, 124, 126, 128 varies between 80 and 420 with a mean value of 196; and, in FIG. 7D the local period 166 from including the last six IMF components 118, 120, 122, 124, 126, 128 varies between 8 and 77 with a mean of 35.6 days. It should be noticed that the time scales are variable and process dependent and, in particular not determined subjectively. Therefore, time scale selection may be effected only by selecting different IMF combinations, i.e., low pass filter selection. However, unlike prior art approaches, once the IMFs are selected, the data determine the time scale and, accordingly, the trend. Also the periods are determined by which successive IMF component are included and reveal nearly factor 2 change, indicating that the EMD filtered components may serve as a dyadic filter.

Figure 7D:
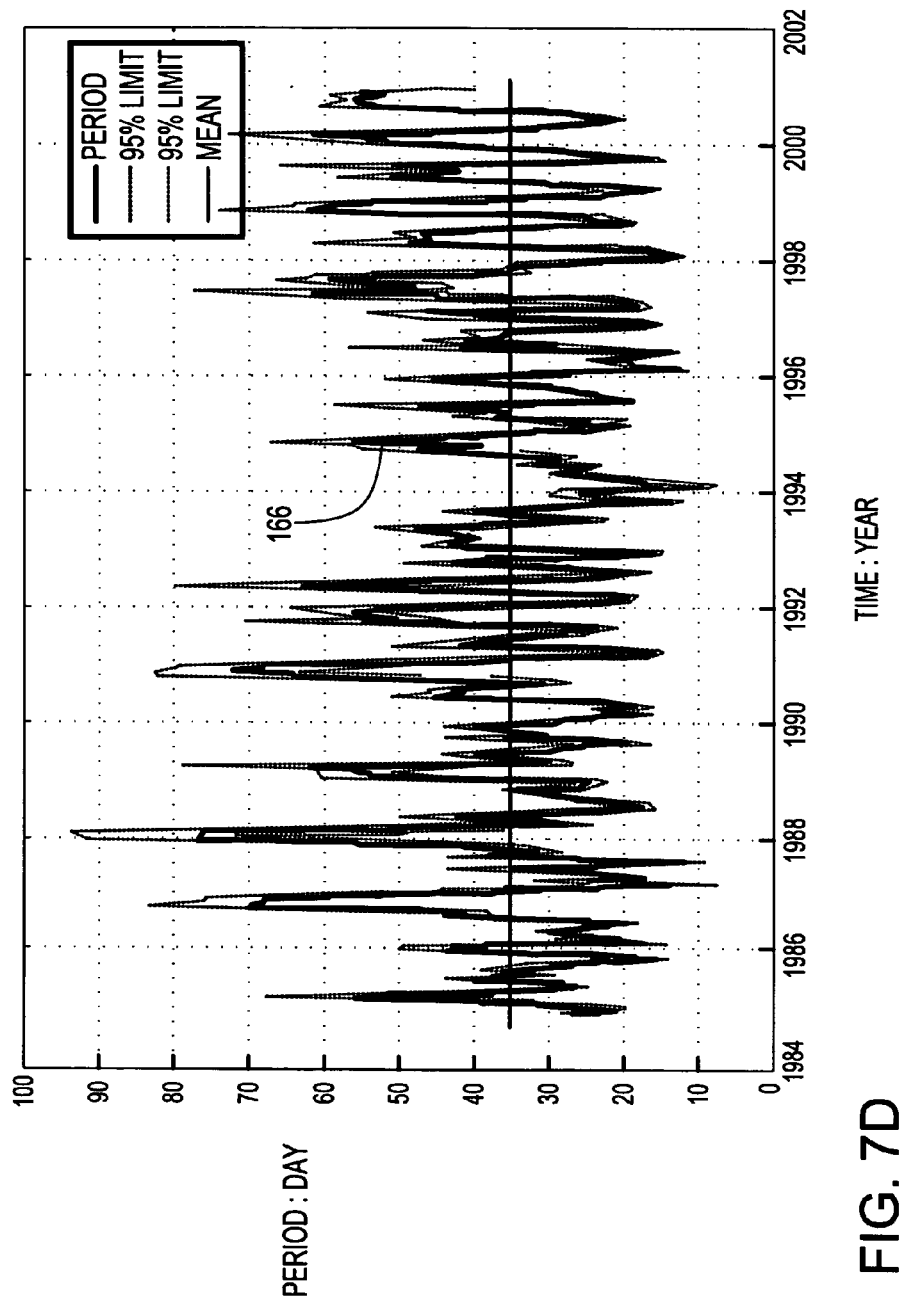
Figure 8A:
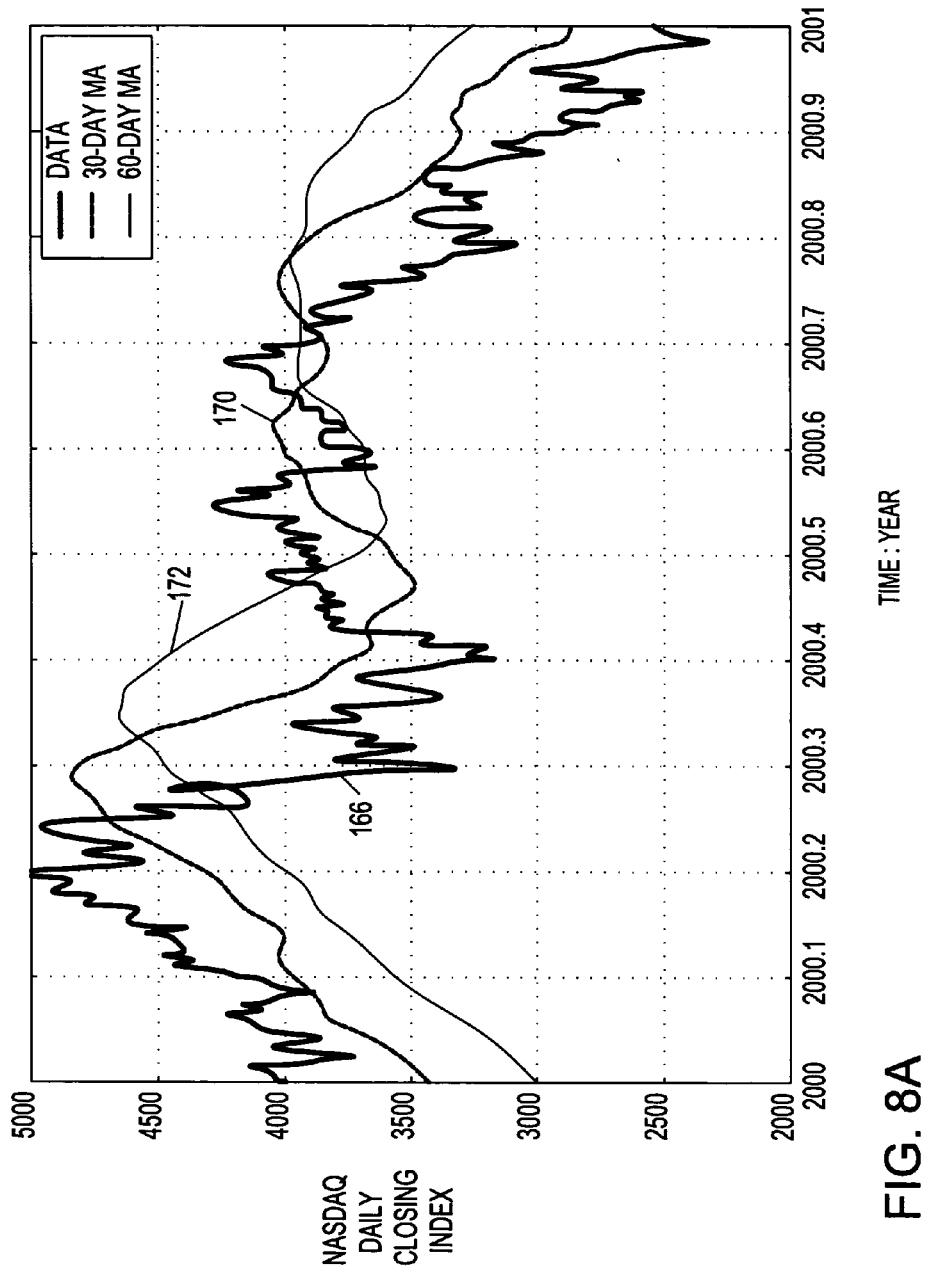
FIGS. 8A-B show a comparison of short term trends determined over a single year, 2000, using both traditional 30 and 60 day moving averages and the analogous extracted local time period.
Figure 8B:
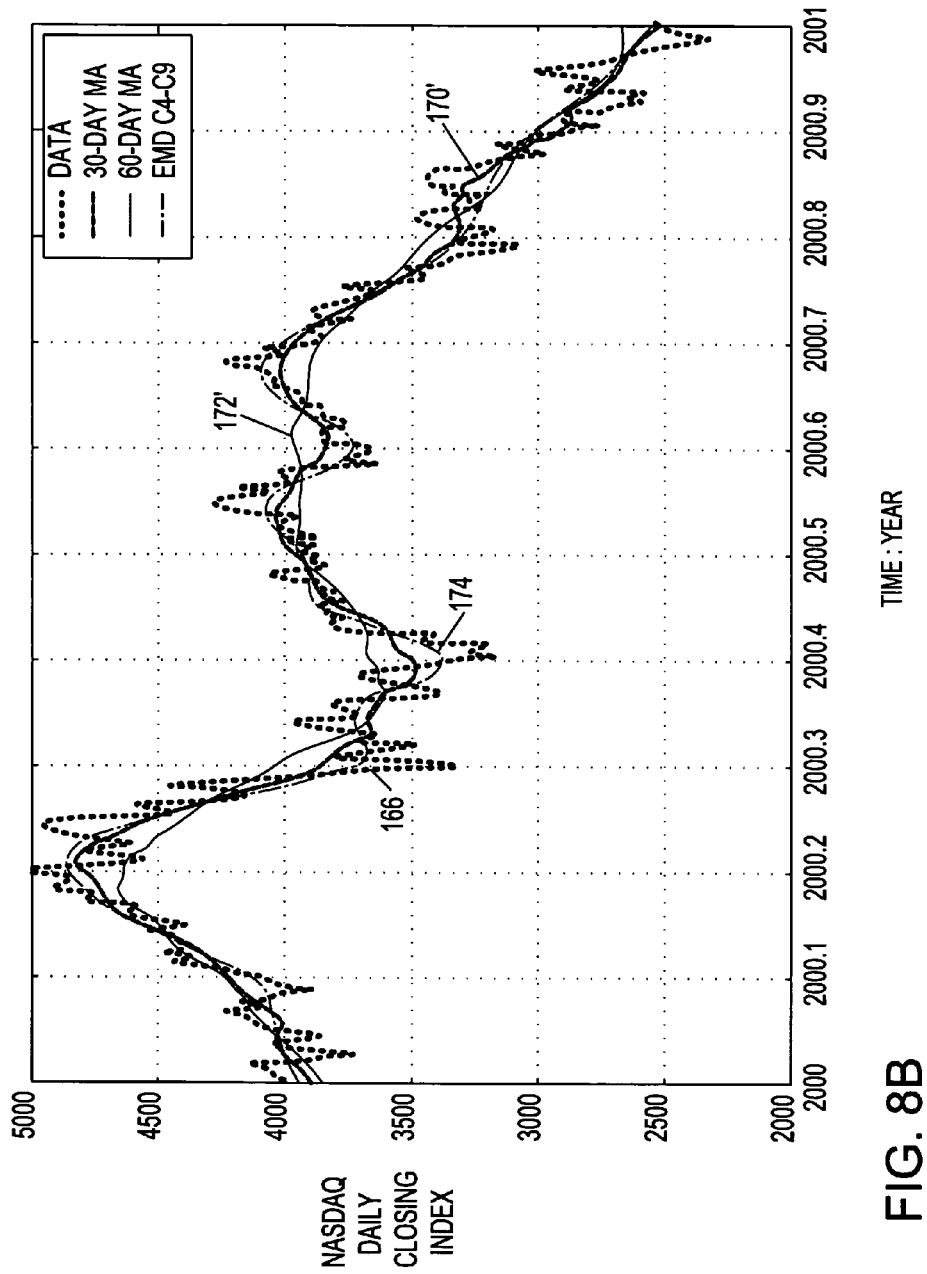

FIGS. 8A-B show a comparison of short term trends determined over a single year, 2000, using traditional 30 and 60 day moving averages 170, 172, respectively, and based on the analogous extracted local time period 166 of FIG. 7D as determined according to a preferred embodiment of the present invention. For nonstationary financial data with no discernable local time scale and/or nonlinear processes and in the financial market analysis in particular, the most popular ways of defining trends has been regression analysis, moving averages or means. However, frequently stationary and, sometimes even, linear assumptions that are used for regression analysis and filtering have proven problematic. Similarly, a pre-determined time length scale, e.g., 30 days and 60 days in this example, must be selected to determine the moving mean. Consequently, both of these powerful methods have proven unsatisfactory for the nonlinear and nonstationary processes. By contrast, however, as can be seen by the comparisons below, trends extracted according to a preferred embodiment of the present invention are truly adaptive.

So, as can be seen from the example of FIG. 8A, it is difficult to justify selecting the 30 and 60 day fixed period or any fixed period for application to the whole non stationary time varying signal. Further, although adaptive, selecting the appropriate time scale is problematic in determining the moving average. Even if an appropriate time scale were selected, it is impossible to know the future value. So, the moving mean 170, 172 is derived from past data and is the backward mean, out of phase with the data. By contrast, the preferred embodiment EMD approach determines the intrinsic trend in real time and so, extracts the appropriate time scale from the data. FIG. 8B shows an example wherein the 30 day mean 170' and 60 mean 172' are shifted by half of the averaging time duration (i.e., 15 days, 30 days) and compared against a preferred embodiment intrinsic trend 174, which is in real time and unshifted. Thus, the intrinsically fit trend 174 extracted according to a preferred embodiment of the present invention more closely tracks the data.

Figure 9A:
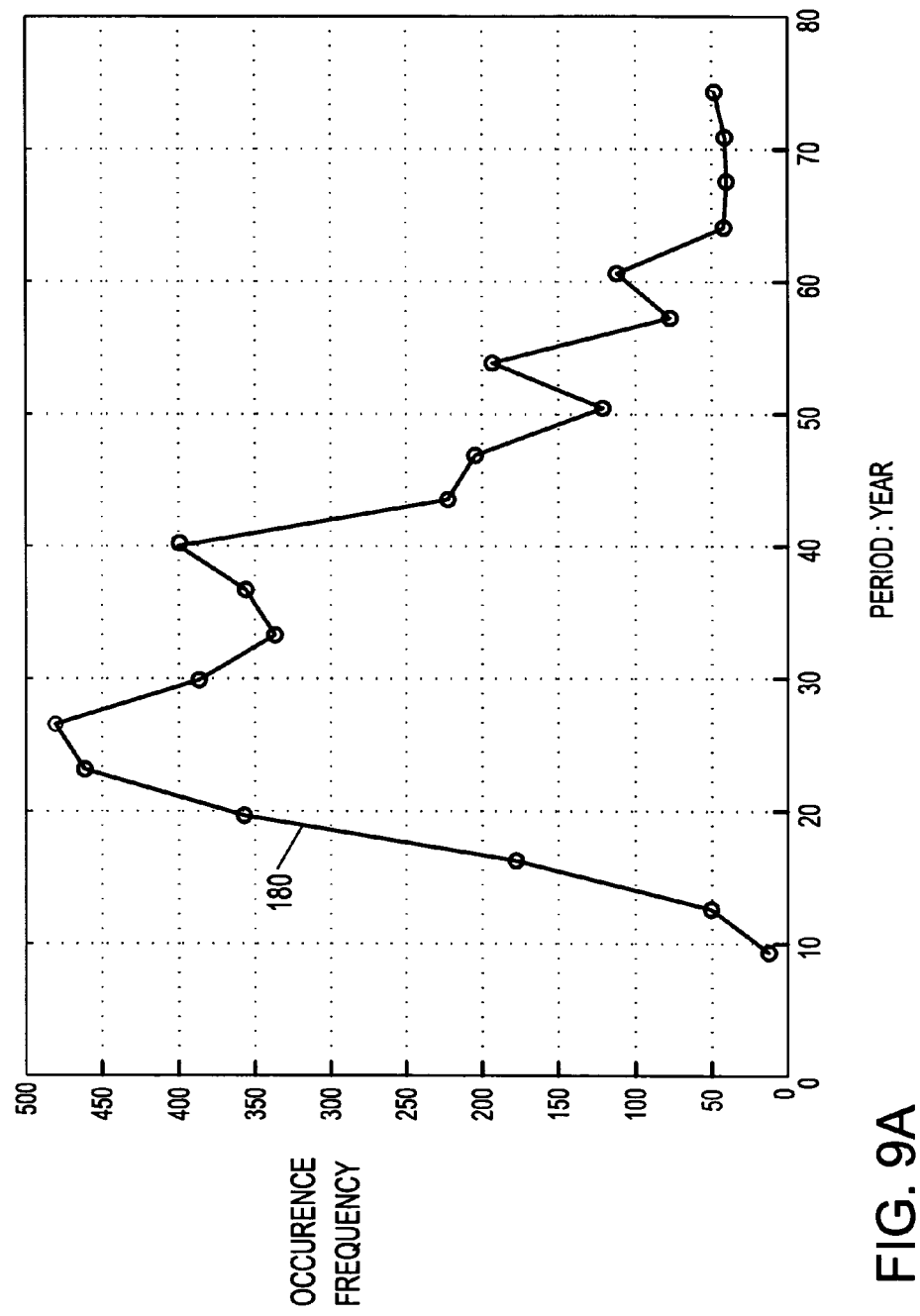
FIGS. 9A-C show the time scale distribution for the extracted local time period of FIG. 7D and compare the detrending using 30 and 60 day moving averages with moving averages determined from extracted local time period.
Figure 9B:
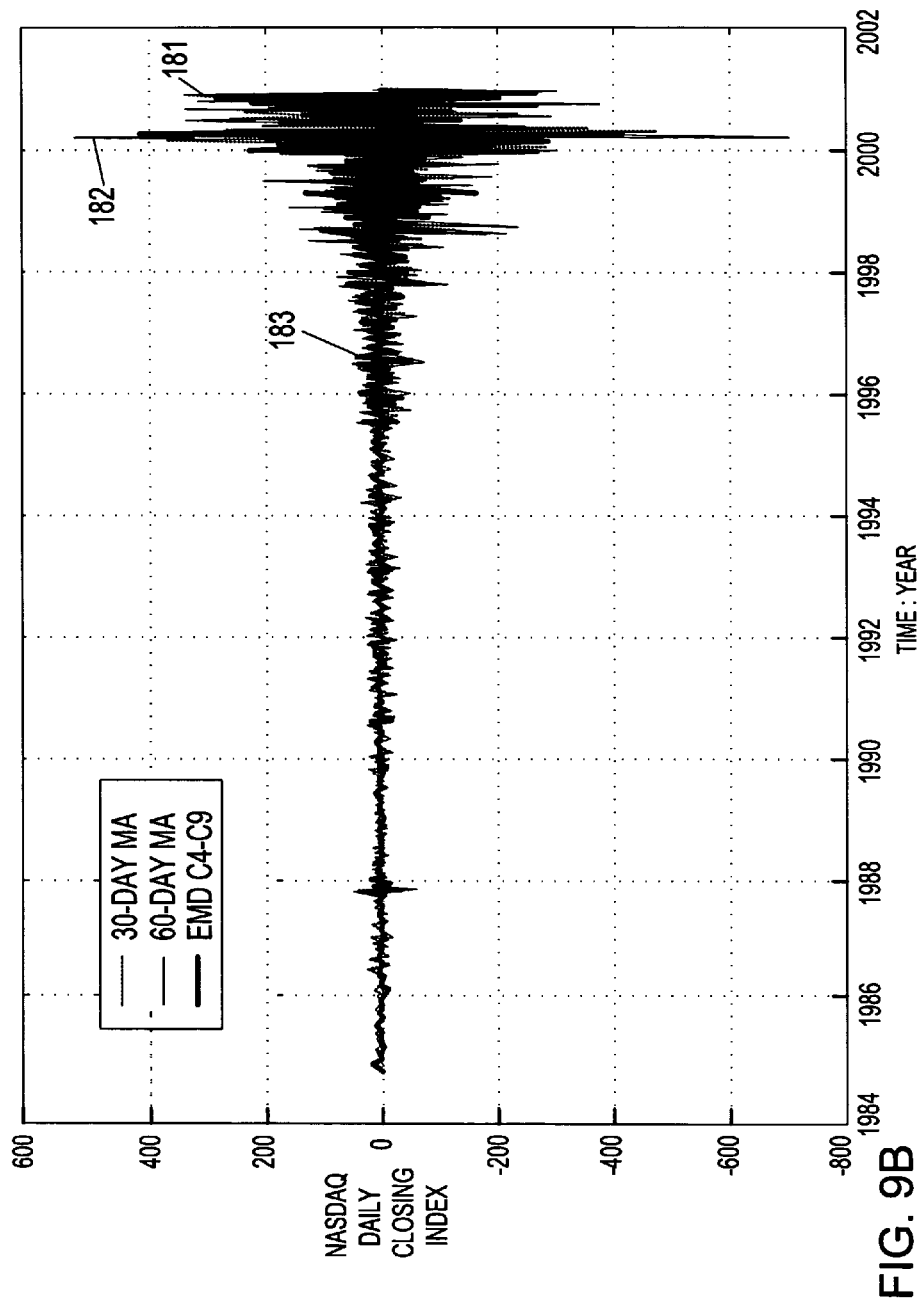
Figure 9C:
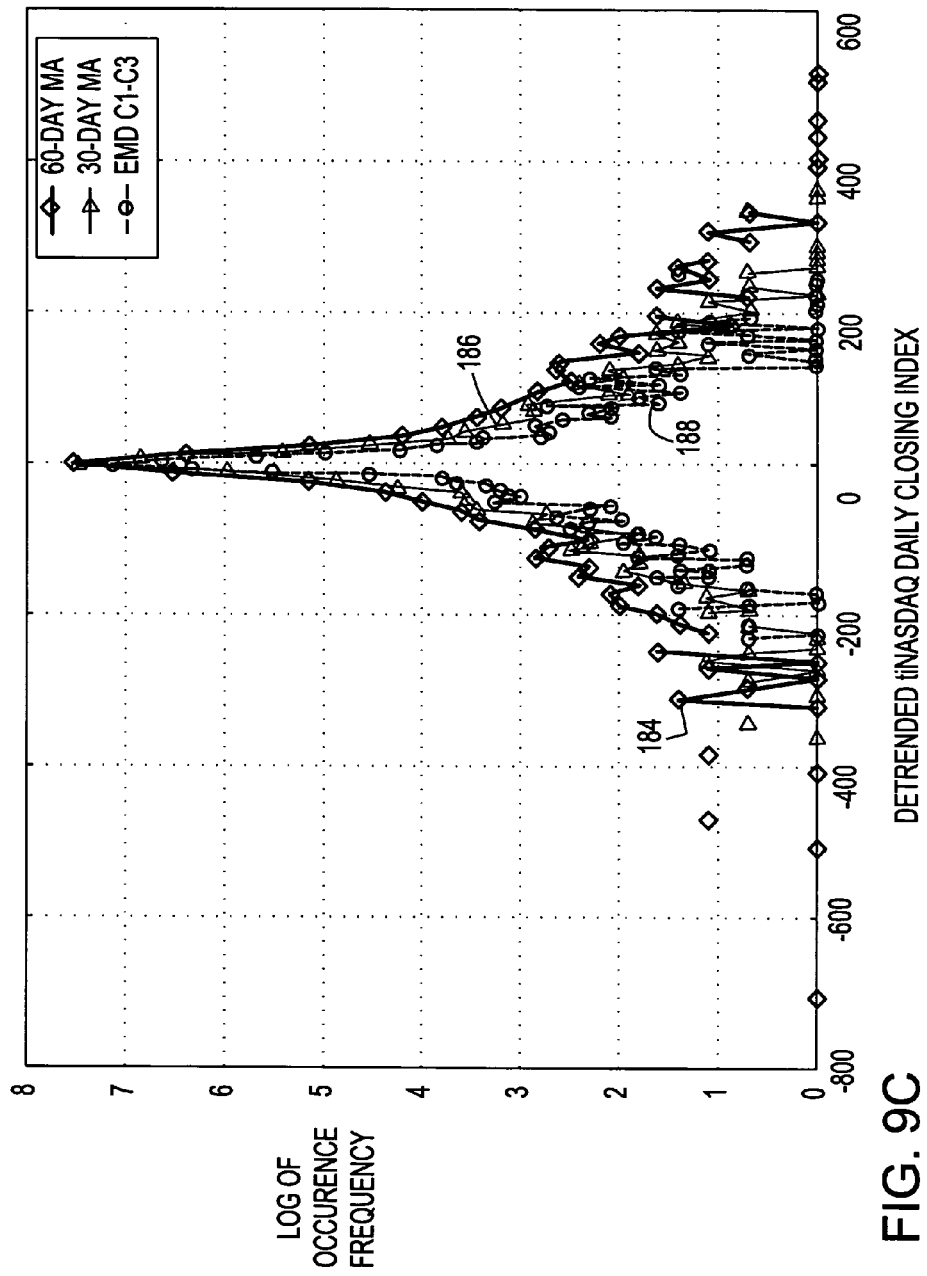

FIGS. 9A-C show the time scale distribution 180 for the extracted local time period 166 of FIG. 7D and compare the detrending using 30 and 60 day moving averages with moving averages determined from extracted local time period 166. Thus using an adaptive time scale, the preferred embodiment overall fit to the data is better as shown by the detrended 30 day moving average signal 181, 60 day moving average signal 182 and EMD detrended signal 183 of FIG. 9B and their distribution given in FIG. 9C. In particular, the Standard Deviations for the 60-day mean 184 is at 54.05; the 30-day mean 186 is at 40.38, and the preferred EMD mean 188 is at 35.86 even though the mean period in this fitting is slightly longer than 30 days. Thus, the preferred embodiment data fitting provides a much truer fit.

As noted hereinabove, the variability is a measure of the volatility of the financial data. It is understood that as used hereinbelow and for simplicity of discussion, variability is the same as volatility for financial data, although variability is more appropriate and meaningful generically for other types of data such as climate change. Further, with regard to financial data a traditional definition of variability is a measure of the market movement or the day-to-day market fluctuation. A common such measure of market movement is gain, $G_t$, which is a discrete logarithm at the time t of the ratio of consecutive index values, $S_t$, and $S_{t-1}$, or the logarithmic ratio of consecutive values (LCRV) and is defined as $$G_t = \log \frac{S_t}{S_{t-1}}.$$

Thus, $$G_t = \log S_t - \log S_{t-1}.$$

Figure 10A:
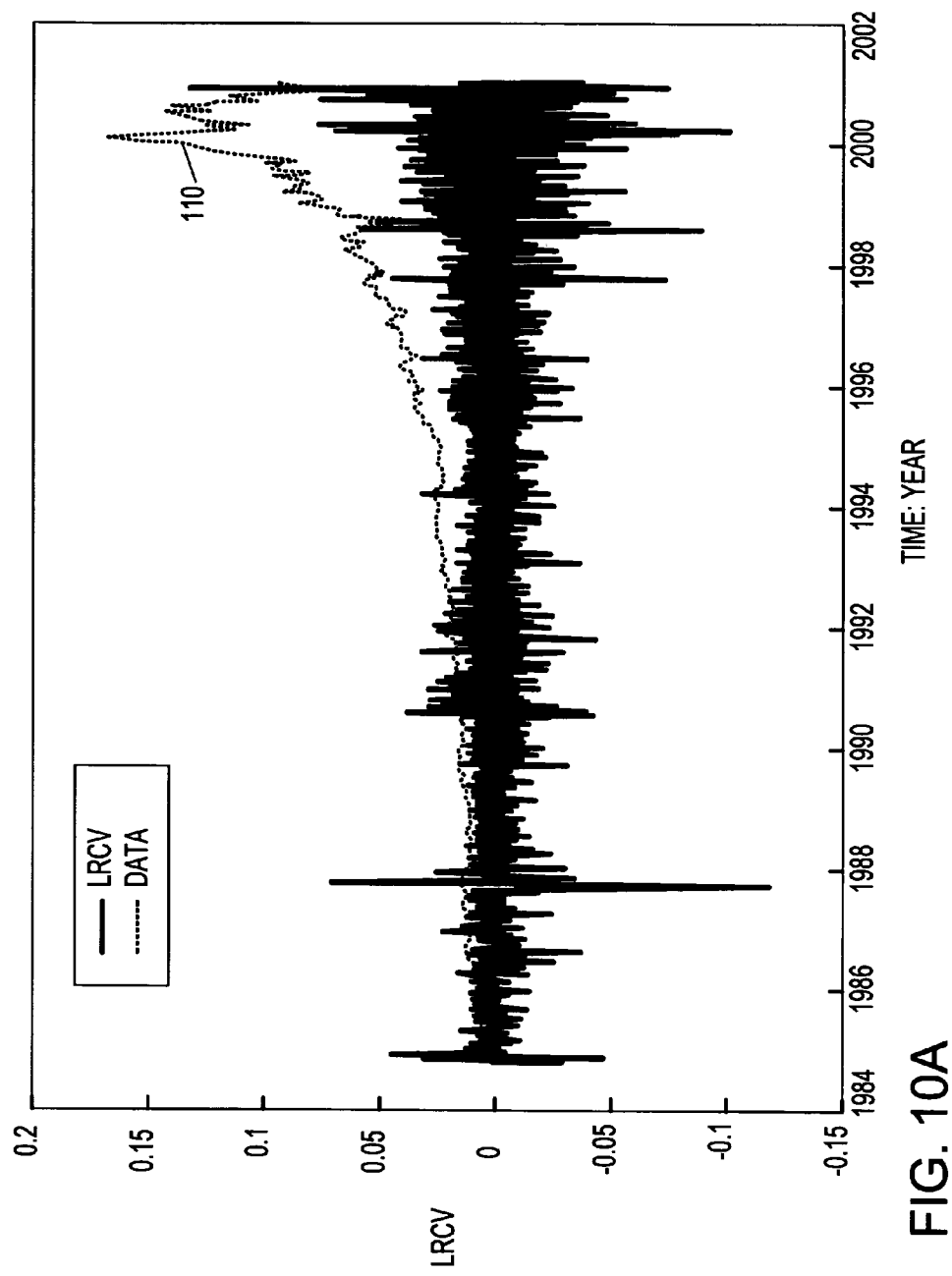
FIGS. 10A-C show a comparison of NASQAD NASDAQ data variability as determined by prior art methods against variability according to a preferred an embodiment of the present invention.
Figure 10B:
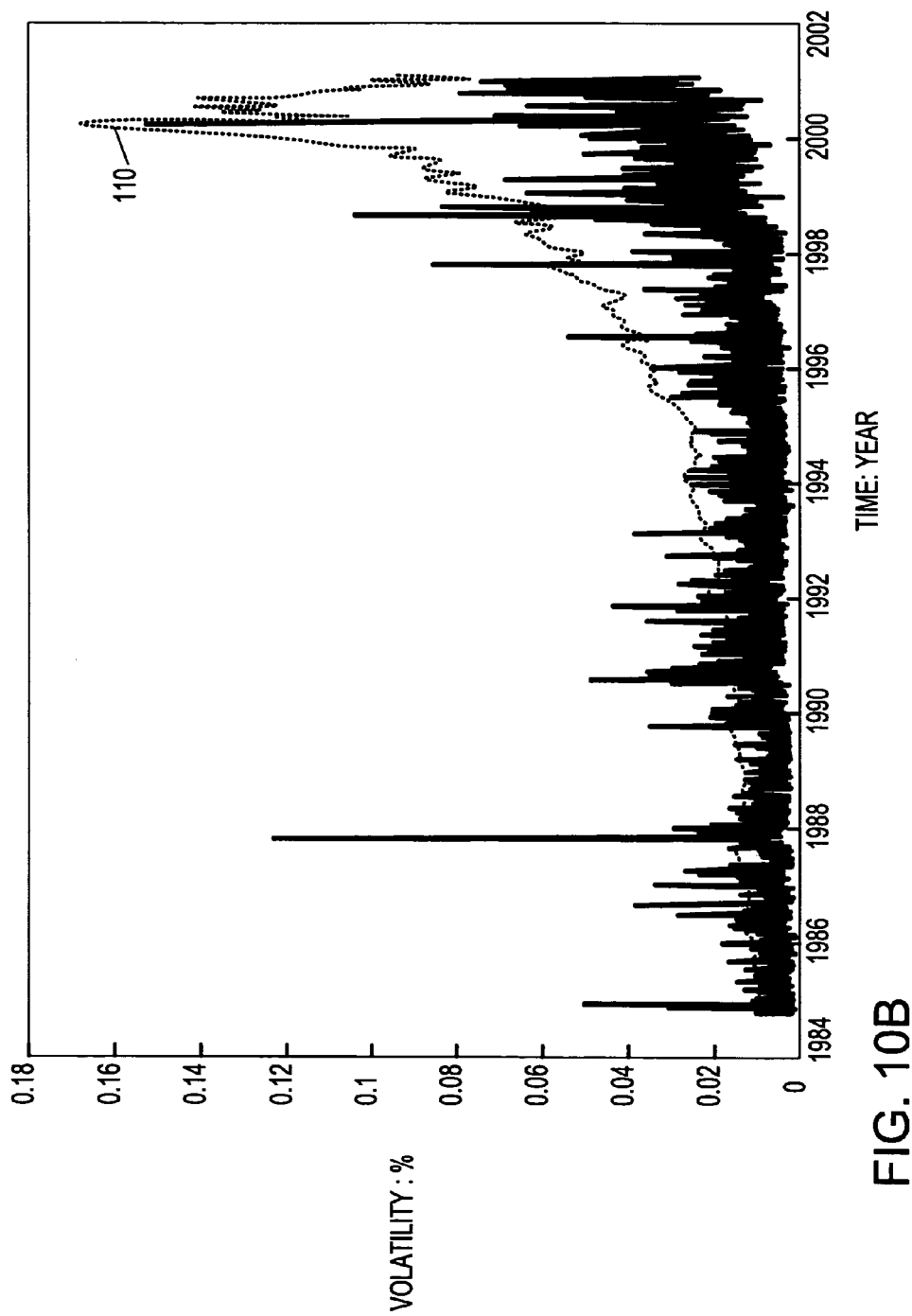
Figure 10C:
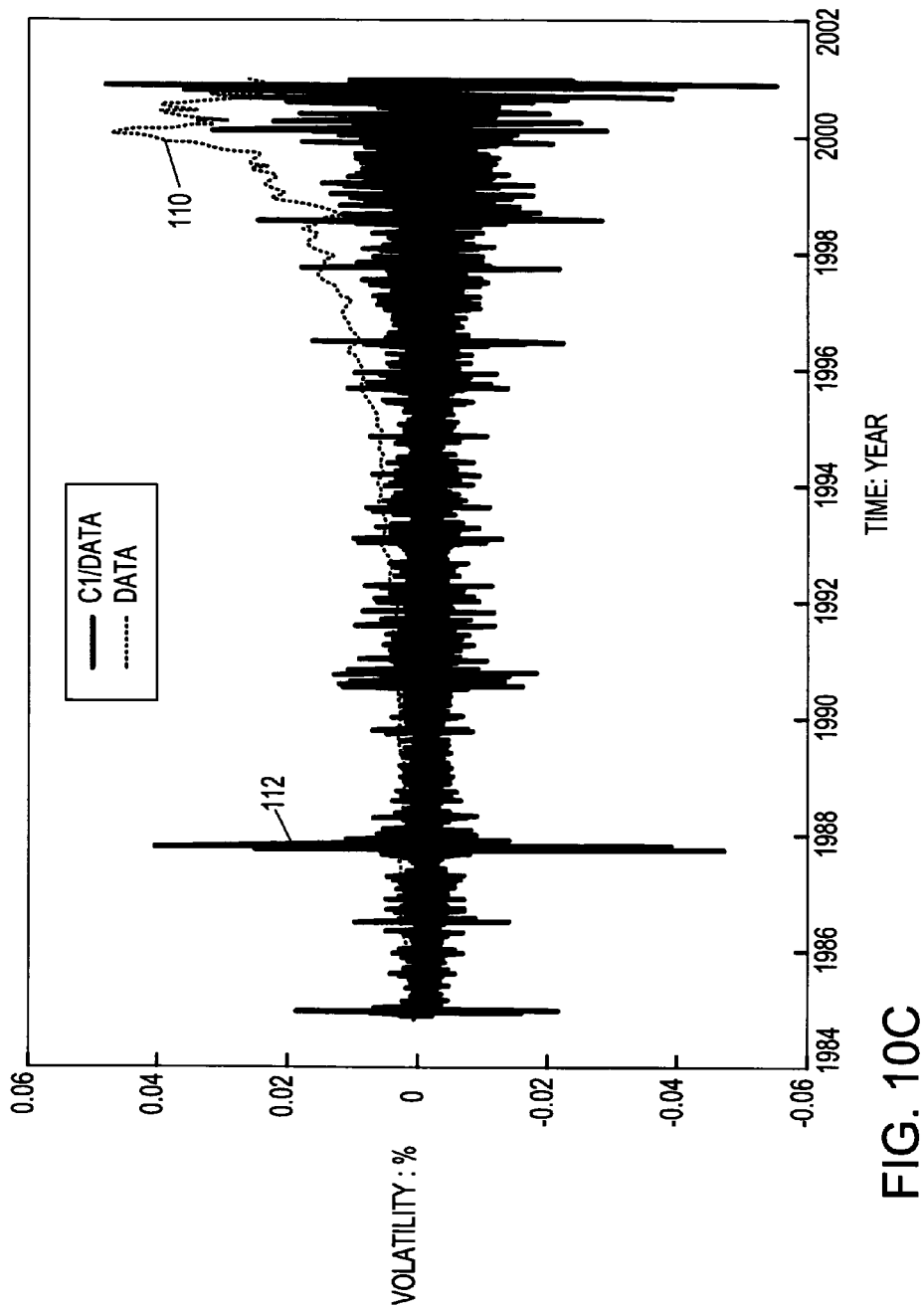

FIGS. 10A-C show a comparison of NASDAQ data variability as determined by prior art methods against variability determined according to a preferred embodiment of the present invention, e.g., the residue after removing the trend. In particular, FIG. 10A shows an example of variability extracted as the gain of the NASDAQ signal 110. FIG. 10B shows an example of variability extracted as the difference between the highest and lowest values (HL) of the price of the NASDAQ signal 110 within one day. By contrast, FIG. 10C shows a measure of the variability as the first IMF component 112 in FIG. 4B from EMD. Thus, it can be seen that the preferred embodiment variability measurement provides an indication of the fastest or the shortest periods of price fluctuation.

It should be noted that the three methods do not afford a strict apples to apples comparison because, for example, the HL values are always positive, while both the gain and EMD values can be both positive and negative. So, to facilitate comparison, for example, the gain and the EMD variability may be rectified by taking their absolute values. Alternately, since the gain measures a ratio, the HL and the EMD may be normalized by the local daily price for a better comparison as in steps 1094-1098 of FIG. 2C. Additionally, the time scales are not common for all three variability examples of FIGS. 10A-C. Both the gain and HL measurements are day-to-day or daily variability measurements. By contrast the preferred embodiment EMD variability measurement is the extracted fluctuation from an underlying mean of the next IMF component 114. Therefore, the time scale of this underlying mean must be identified.

Figure 11A:
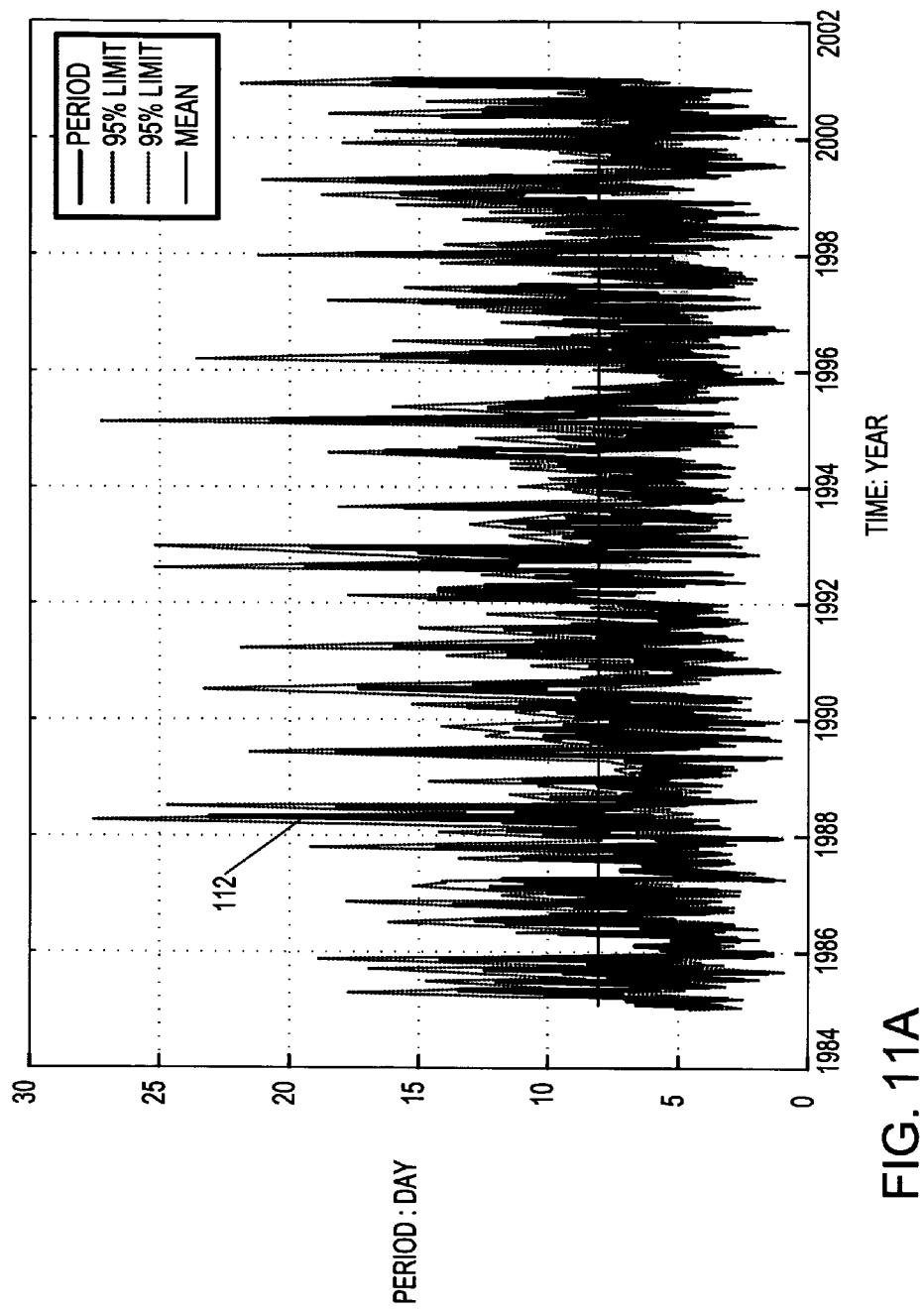
FIGS. 11A-B show the time scale determination for the variability.
Figure 11B:
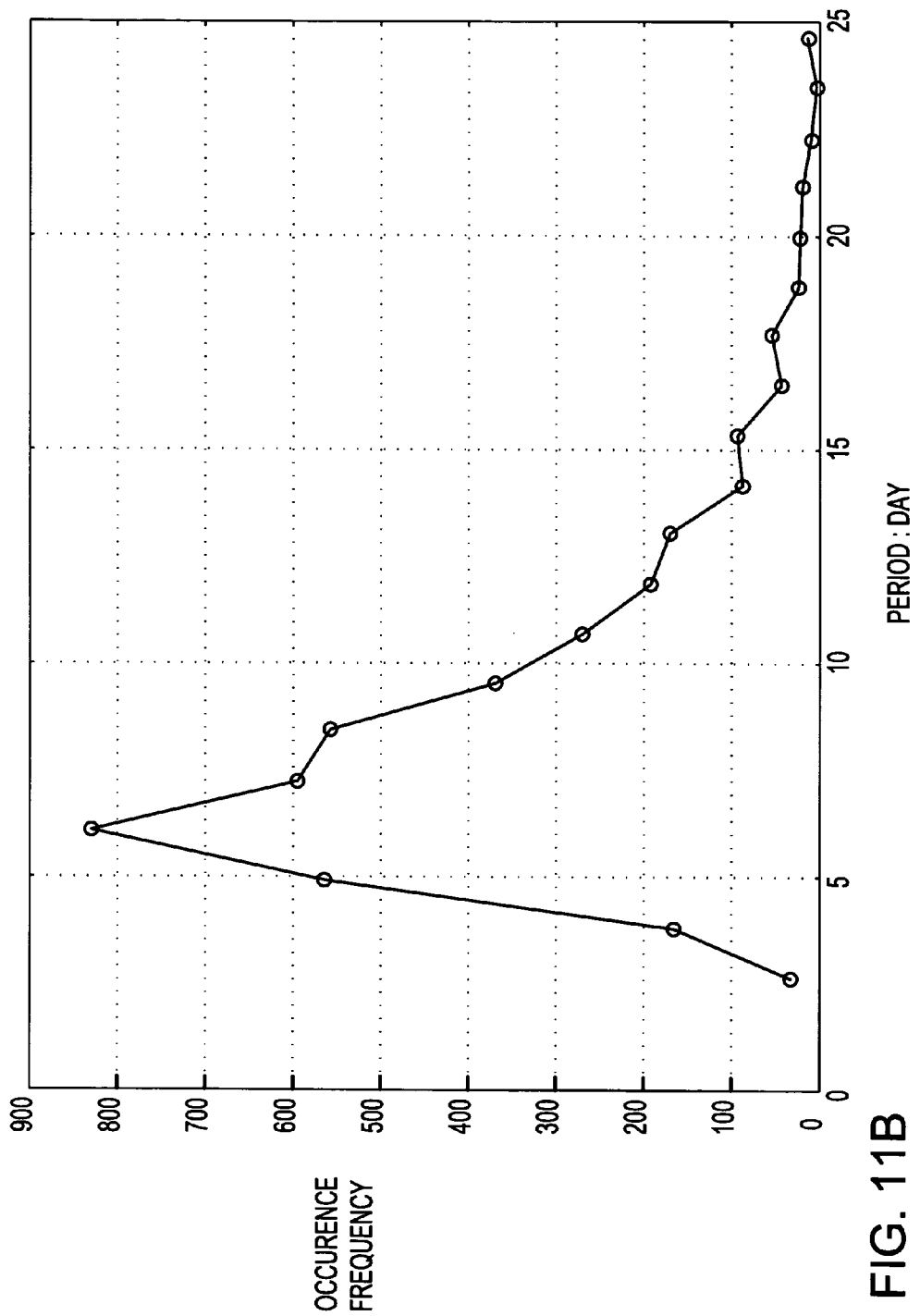

FIGS. 11A-B show the time scale determination for the variability according to a preferred embodiment of the present invention. In particular, FIG. 11A shows period determination for the first IMF component 112, determined analogously to FIGS. 7A-D. The time period for this first IMF component 112 has a mean of 8.38 days and a range of 2-25 days. FIG. 11B shows the distribution of the time scale of the time periods of FIG. 11A. So, the preferred embodiment EMD variability measures essentially the price fluctuation over an 8-day mean period.

Figure 12A:
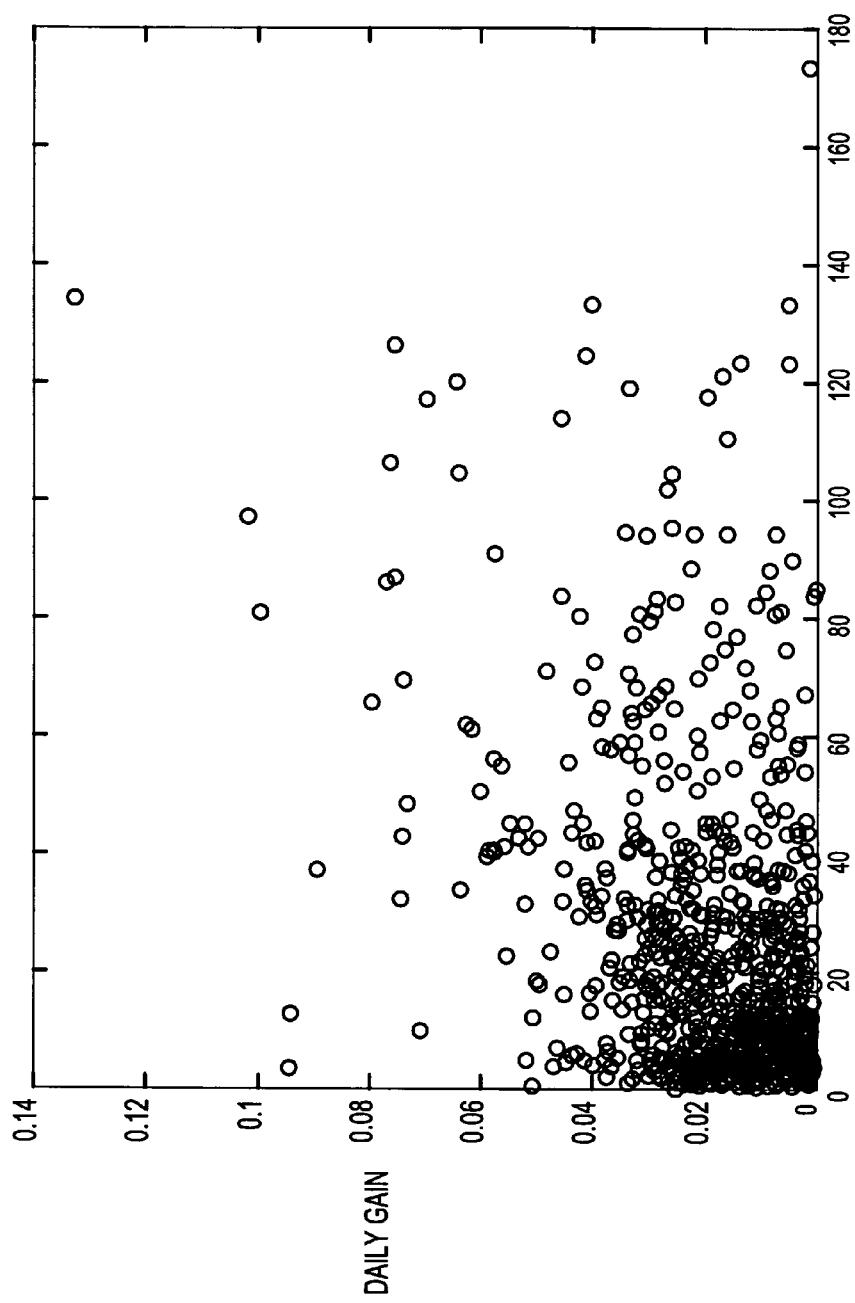
FIGS. 12A-C show scattering plots of comparing the variability measurements of FIG. 10A-C.
Figure 12B:
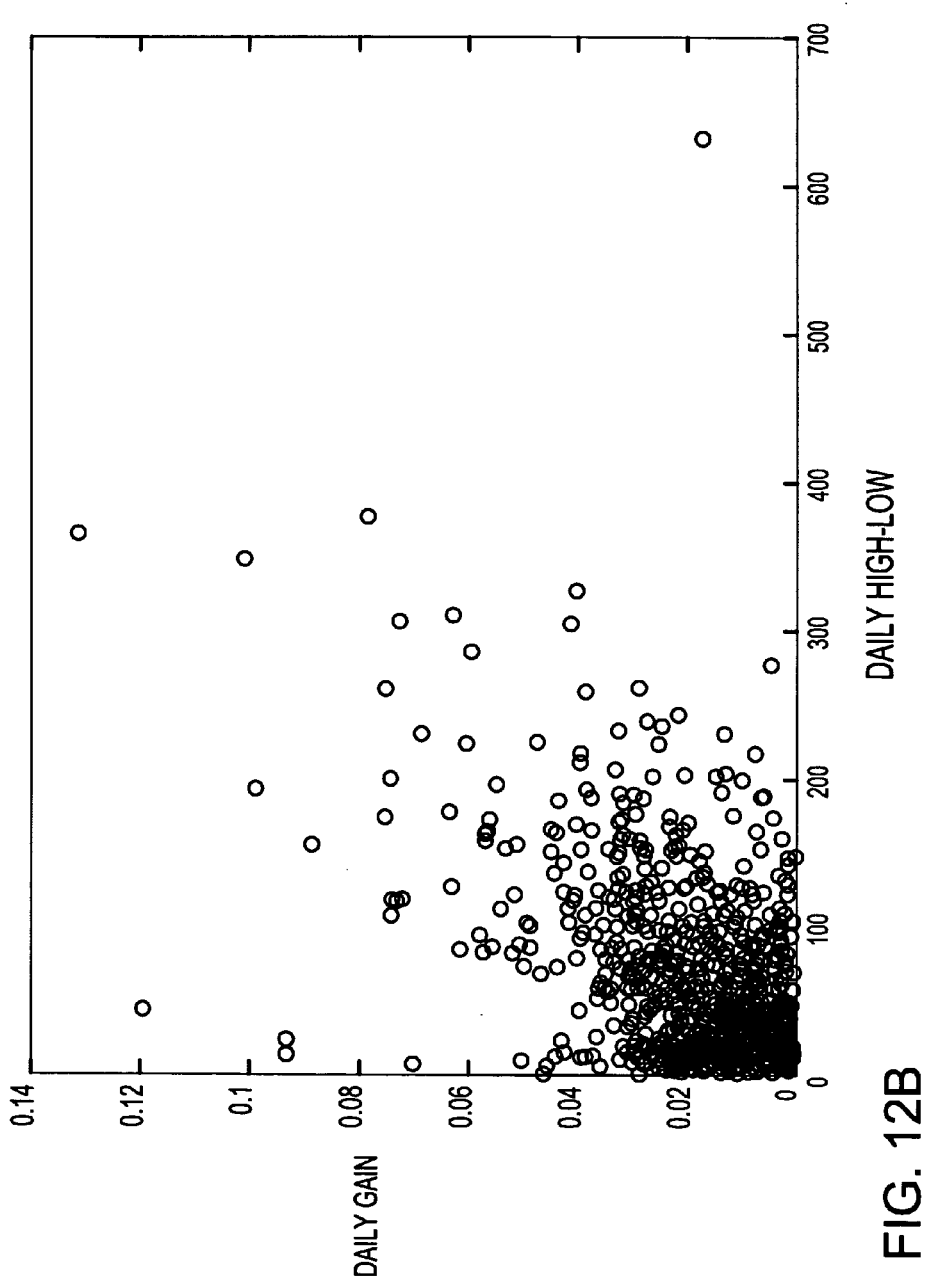
Figure 12C:
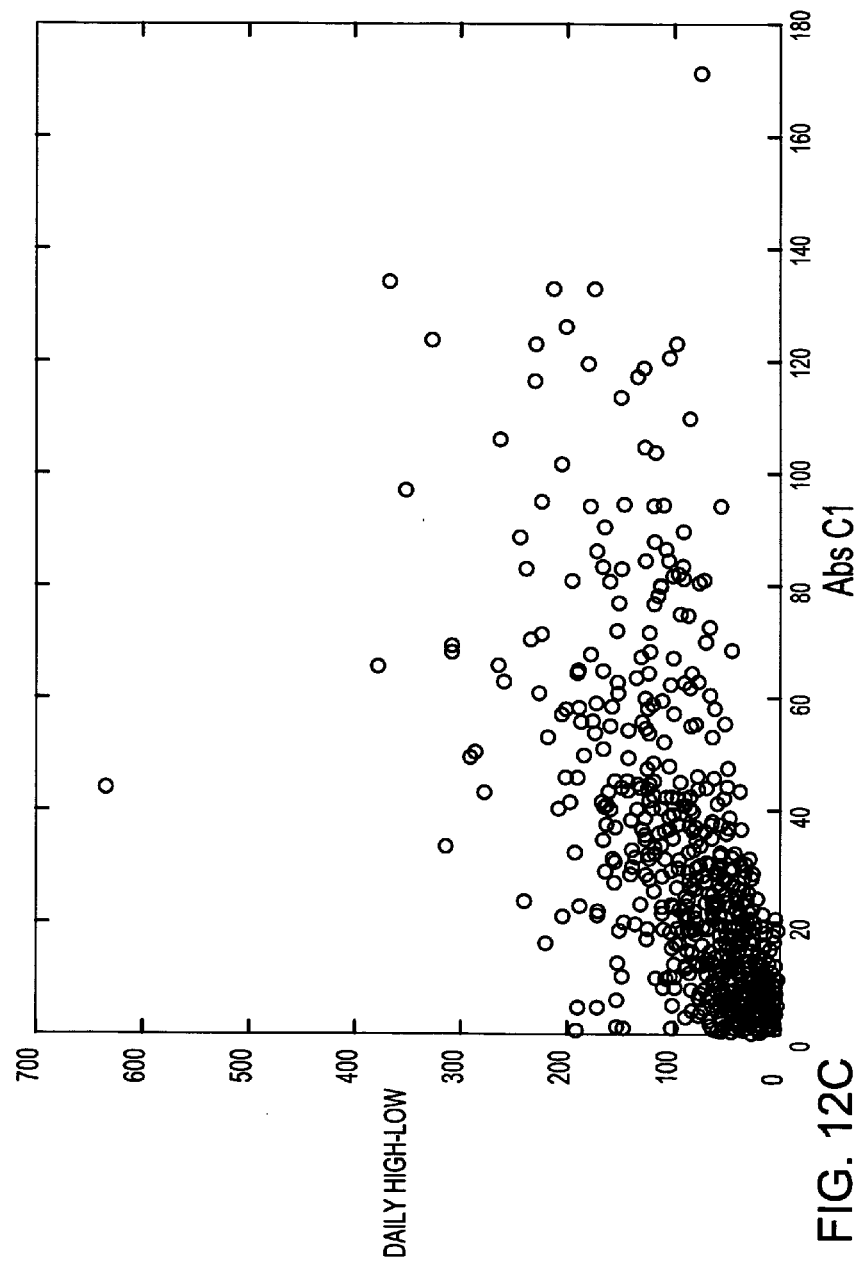

FIGS. 12A-C show scattering plots of comparing the variability measurements of FIGS. 10A-C. FIG. 12A shows a pairwise comparison of the gain and EMD variability measurements. FIG. 12B shows a pairwise comparison of the gain and HL variability measurements. FIG. 12C shows a pairwise comparison of the EMD and HL variability measurements. Both the EMD components and the HL variability measurements are derived from data extrema. So, as might be expected, these scattering plots indicate a lack of interrelationship except some hint of correlation between the HL and EMD measurements in FIG. 12C. Both reflect the high-low differences, although the EMD variability is over a period longer than one day, i.e. the major difference is the time scale. The fact that there is some correlation between the daily fluctuation and the fluctuation over a mean of 8 days suggests that the market has some persistence.

Figure 13:
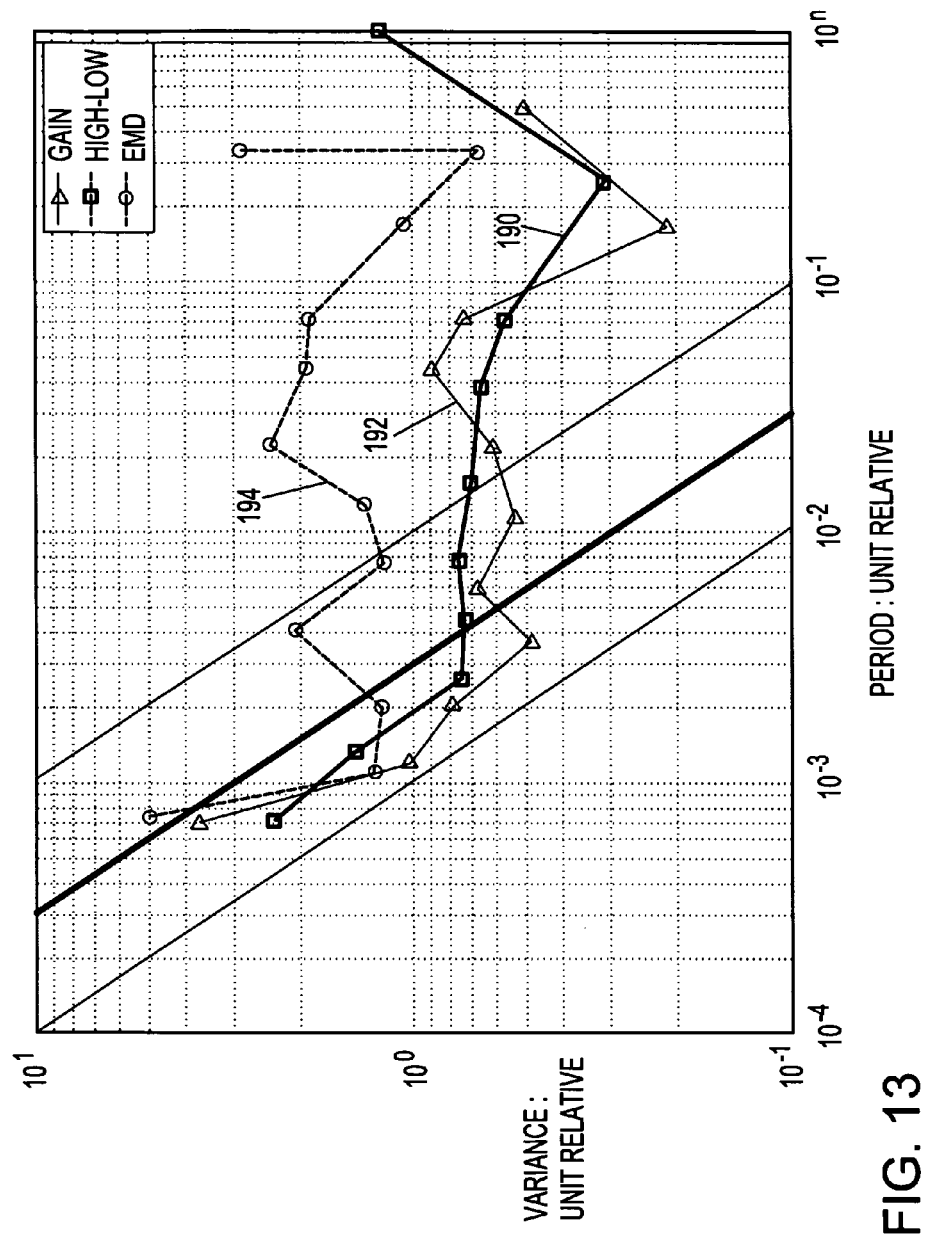
FIG. 13 shows an example of a comparison of significance test results for the gain variability measurements and HL variability measurements with preferred EMD variability measurements.

FIG. 13 shows an example of a comparison of significance test results for the gain variability measurements 190 and HL variability measurements 192 with preferred EMD variability measurements 194. Clearly, all three 190, 192, 194 deviate from the white noise model. Thus, although it has been suggested that financial data are fractional Gaussian noise, the NASDAQ data of this example clearly does not comply with the fractal Gaussian test.

Figure 14:
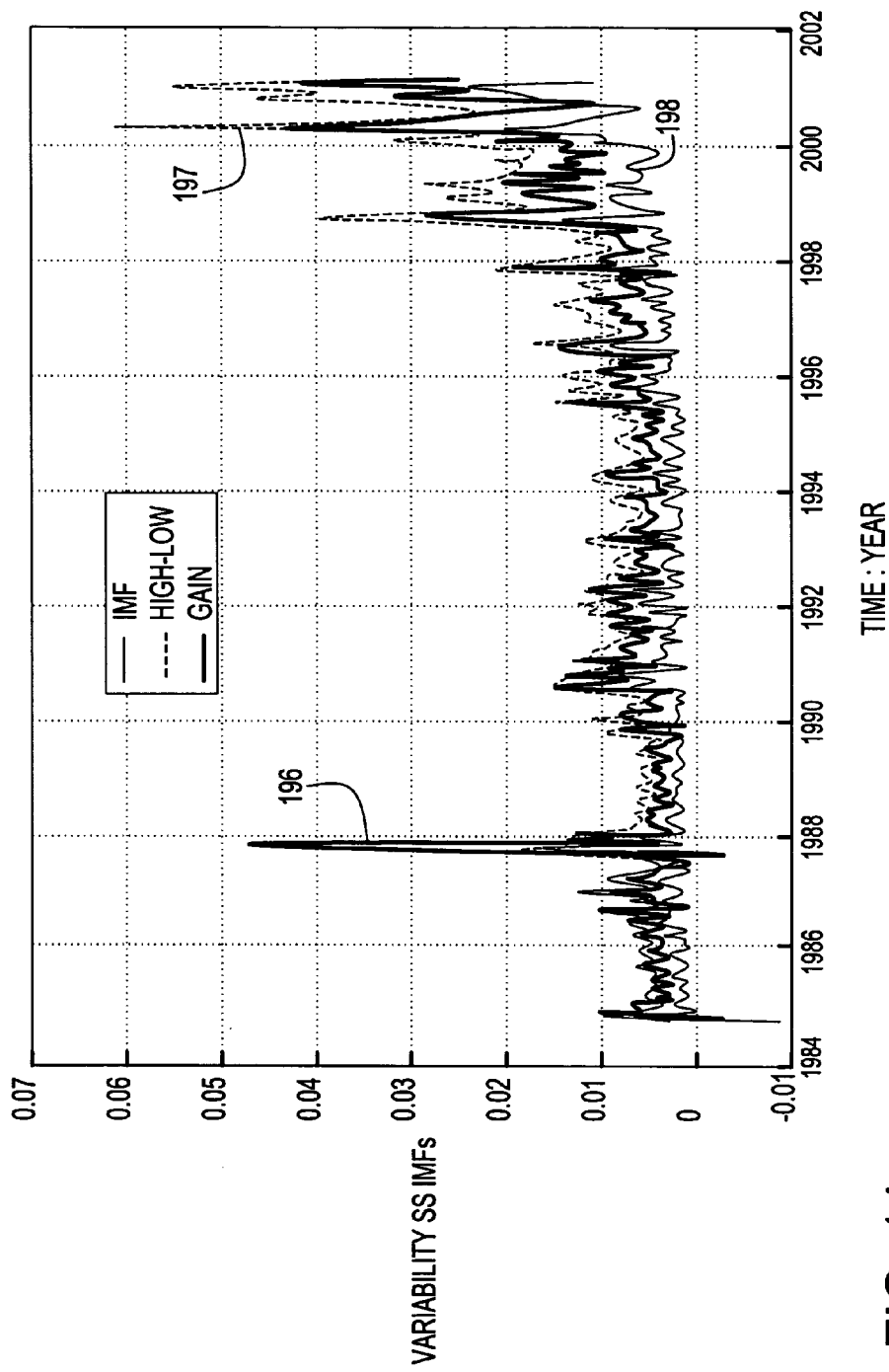
FIG. 14 shows an example of the results of summing the last six IMFs and their normalized values.
Figure 15A:
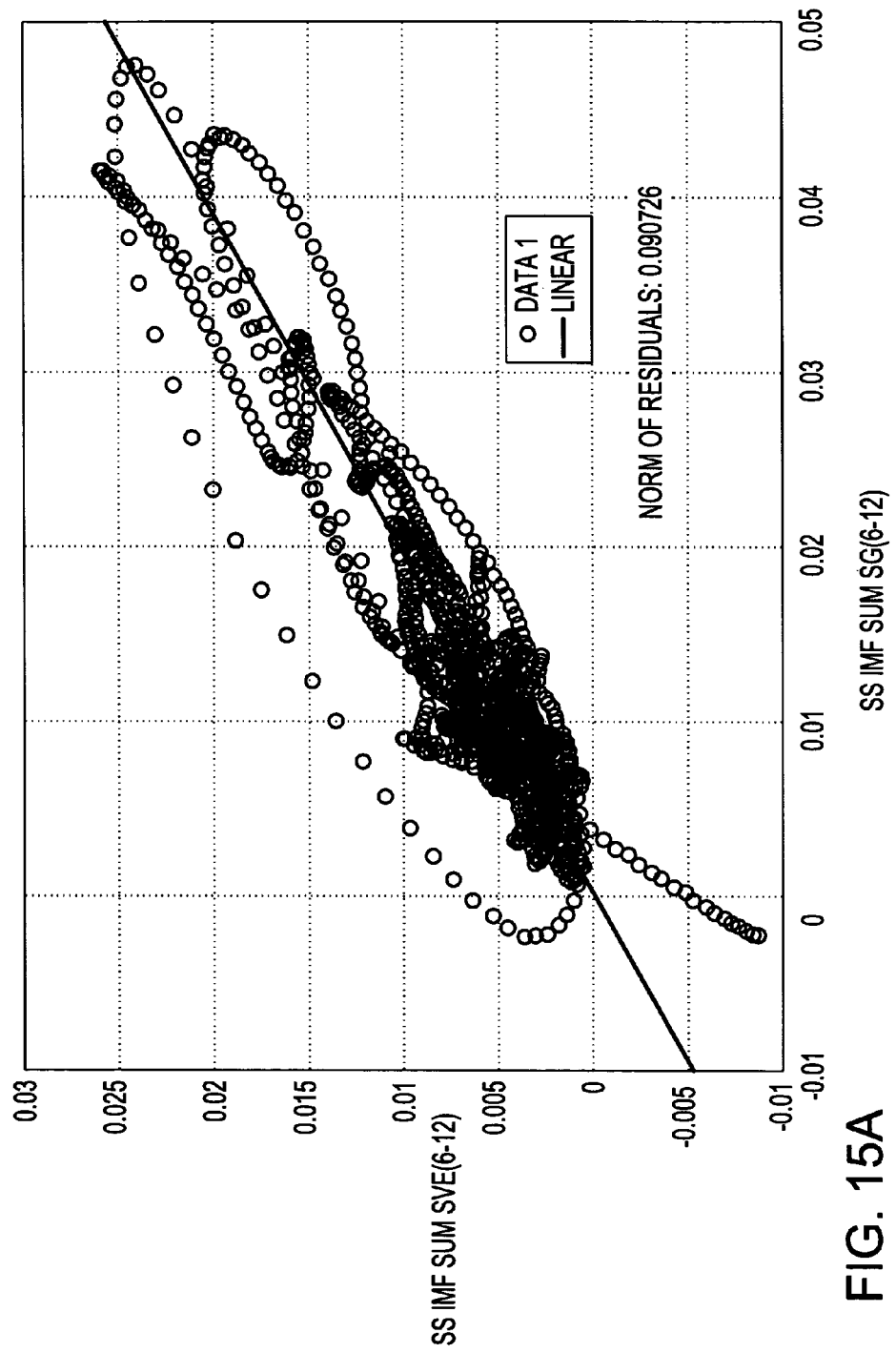
FIGS. 15A-C show scattering plots of the relationship of the trends of FIG. 14 in more detail.
Figure 15B:
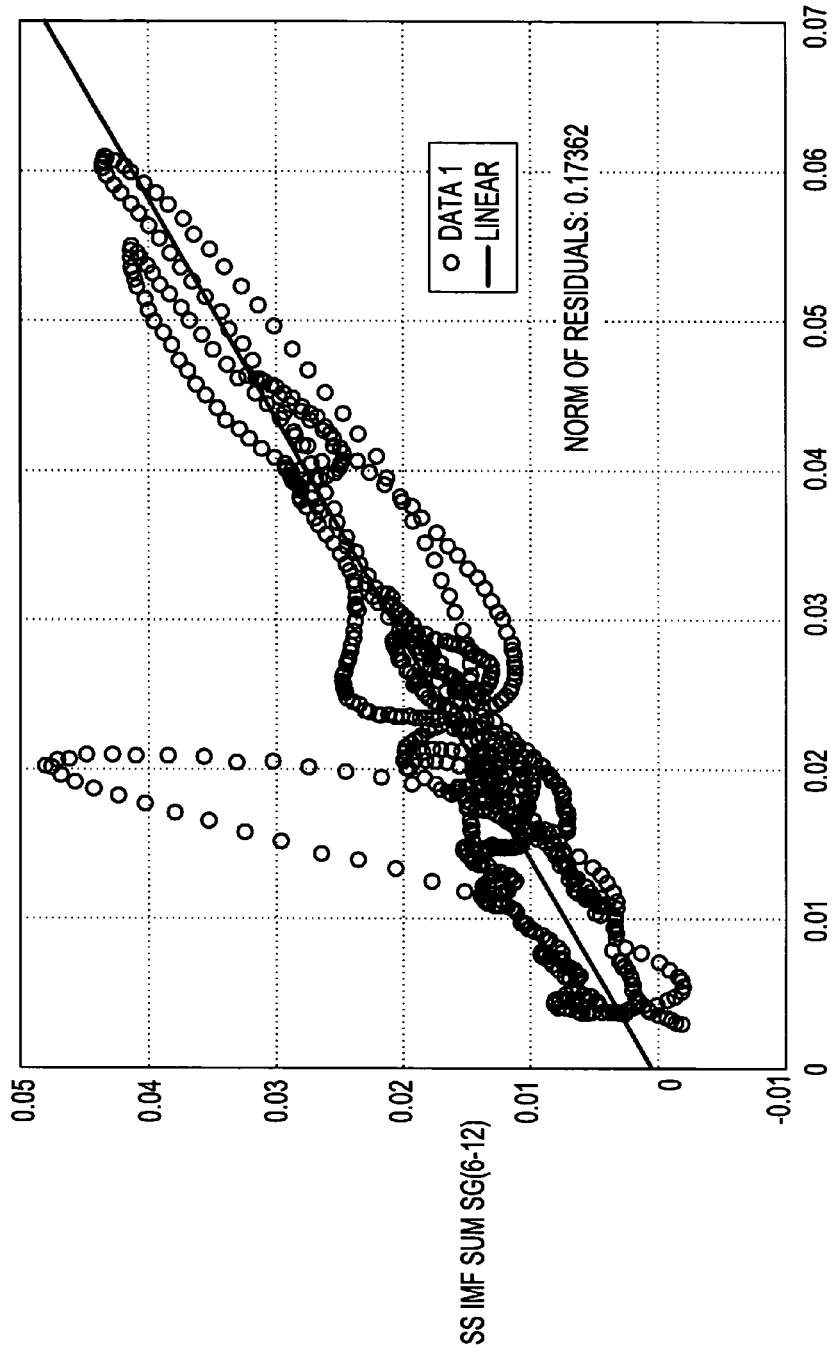
Figure 15C:
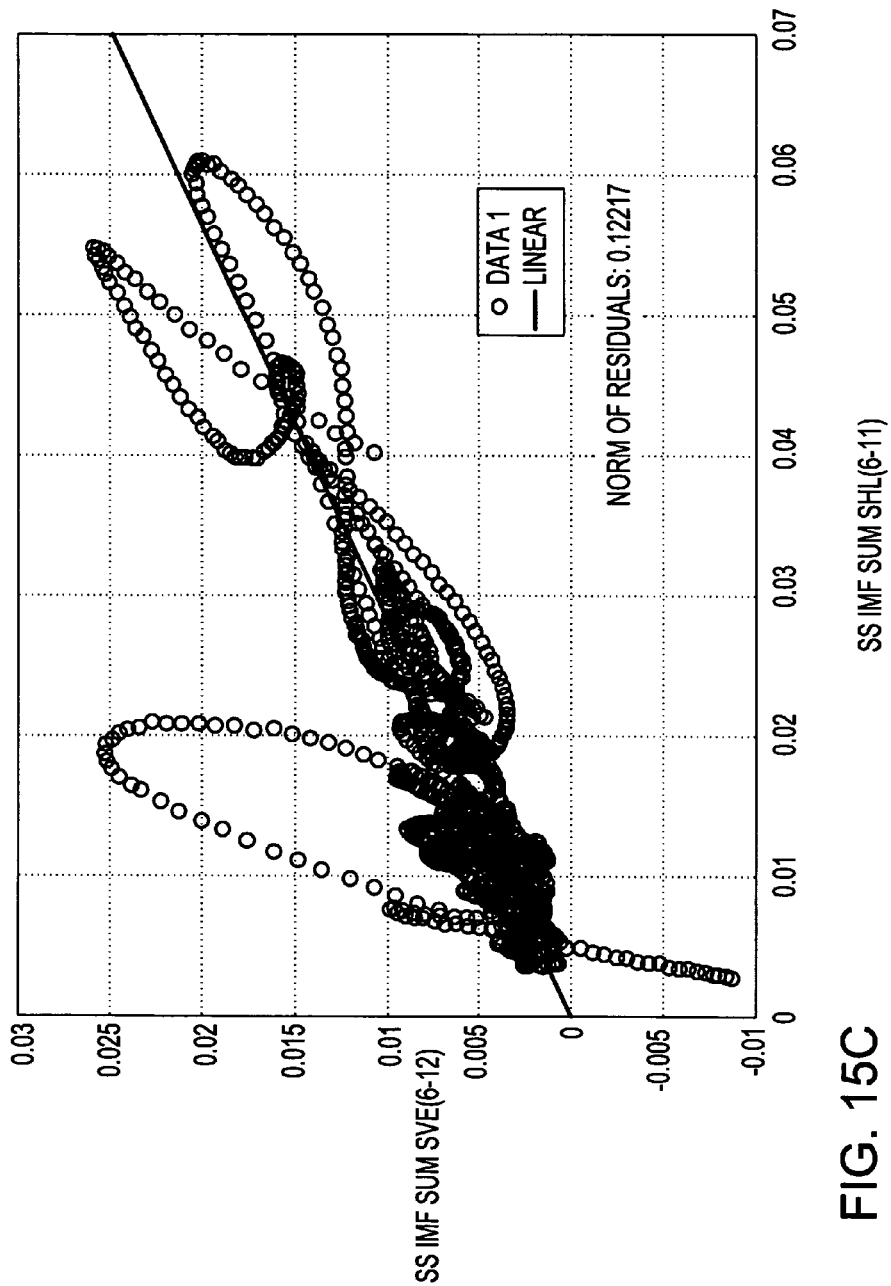

FIG. 14 shows an example of the results of low pass filtering the last six IMFs 118, 120, 122, 124, 126 and 128 in FIGS. 4D-I, and plotting their normalized variability values based on a line equal to three times the period as a statistical significance boundary indication. FIGS. 15A-C are scattering plots showing the relationship of the trends of FIG. 14 in more detail. FIG. 15A shows a pairwise comparison of the gain and EMD trends. FIG. 15B shows a pairwise comparison of the gain and HL trends. FIG. 15C shows a pairwise comparison of the EMD and HL trends. Thus, all methods show clear trend correlations. It should be noted that the trend values may be viewed as trends or variability values, depending on the point of view, i.e., whether the period of interest is shorter than the time scale adopted (a trend), or longer than the time scale (variability).

Figure 16A:
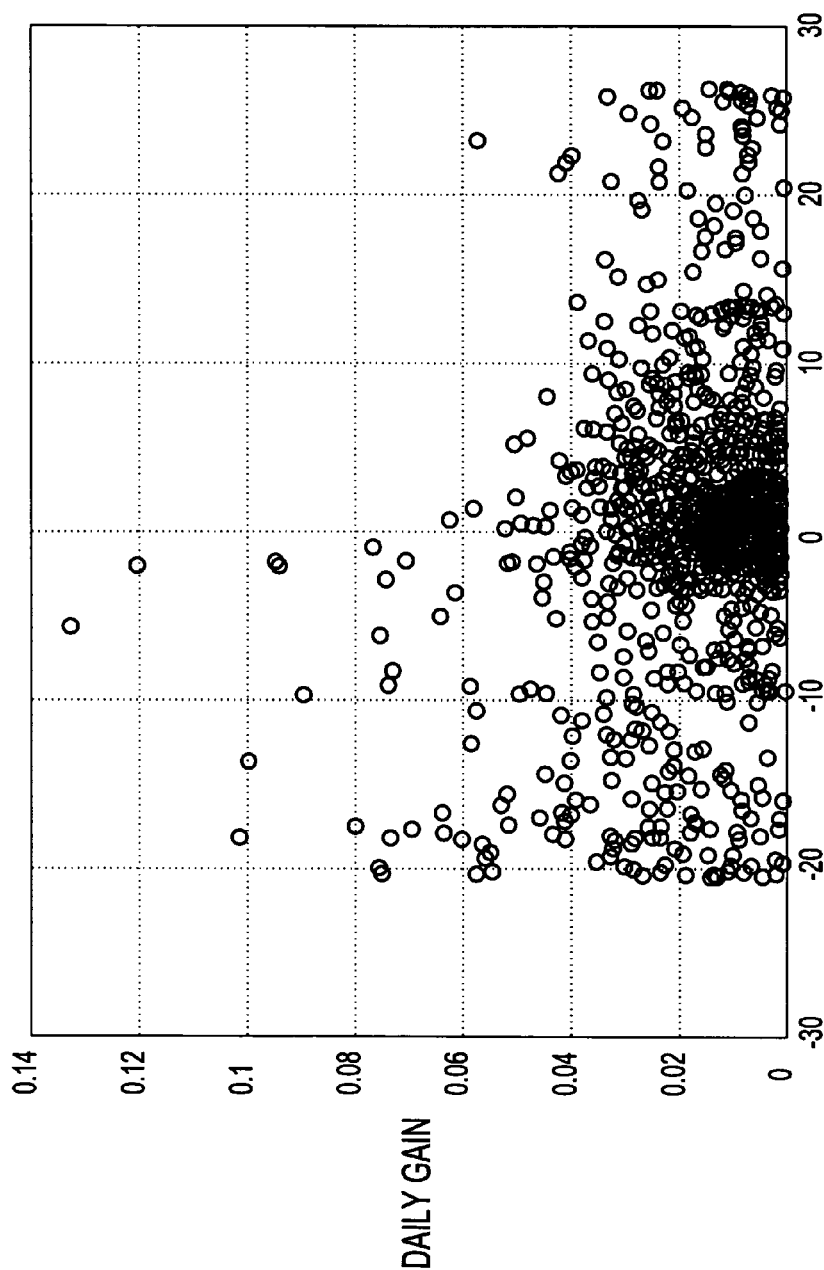
FIGS. 16A-C show the variability values as a function of the market price slope or gradient of the statistically significant components and in particular, for examining higher variability during the periods of downward market trend.
Figure 16B:
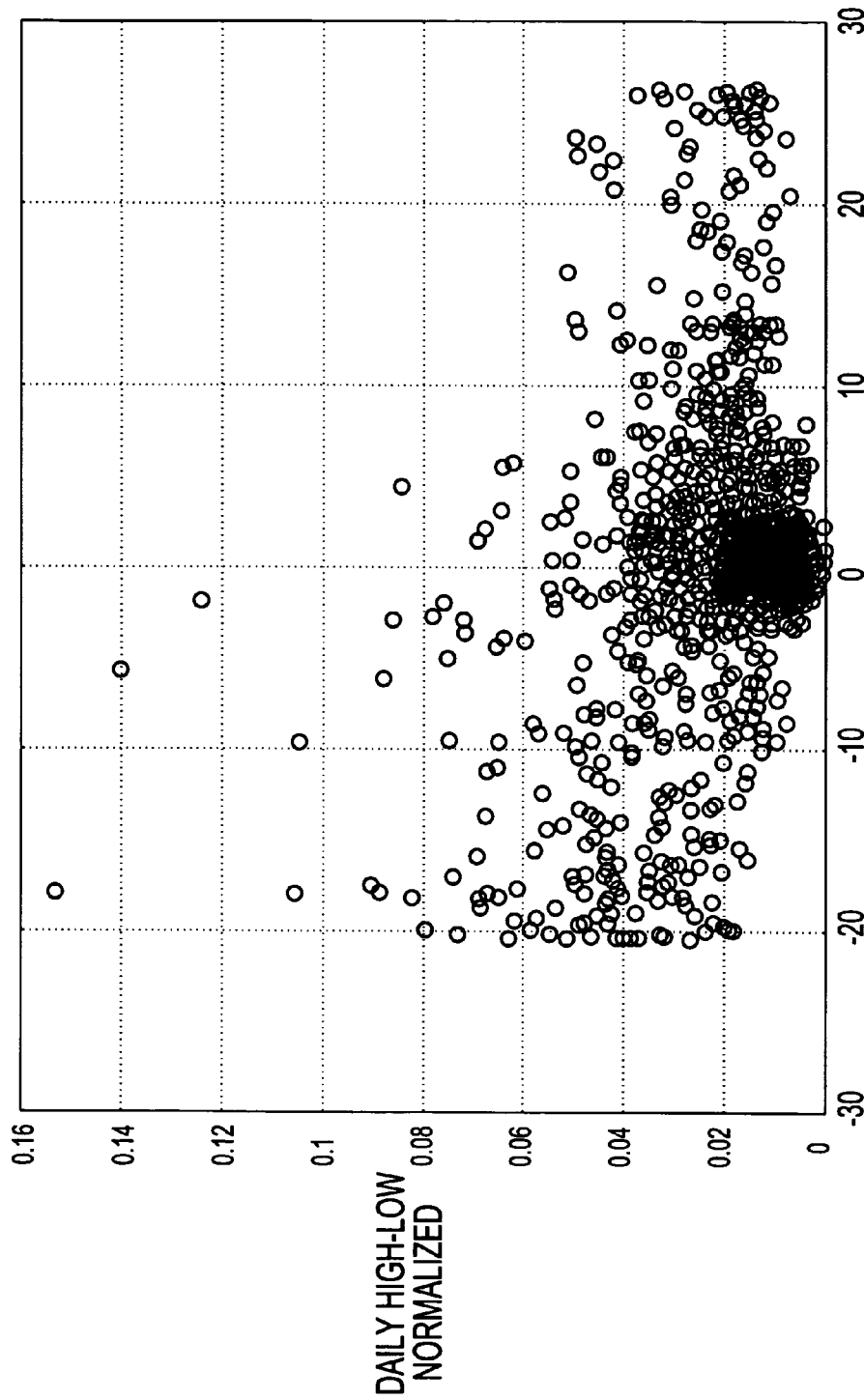
Figure 16C:
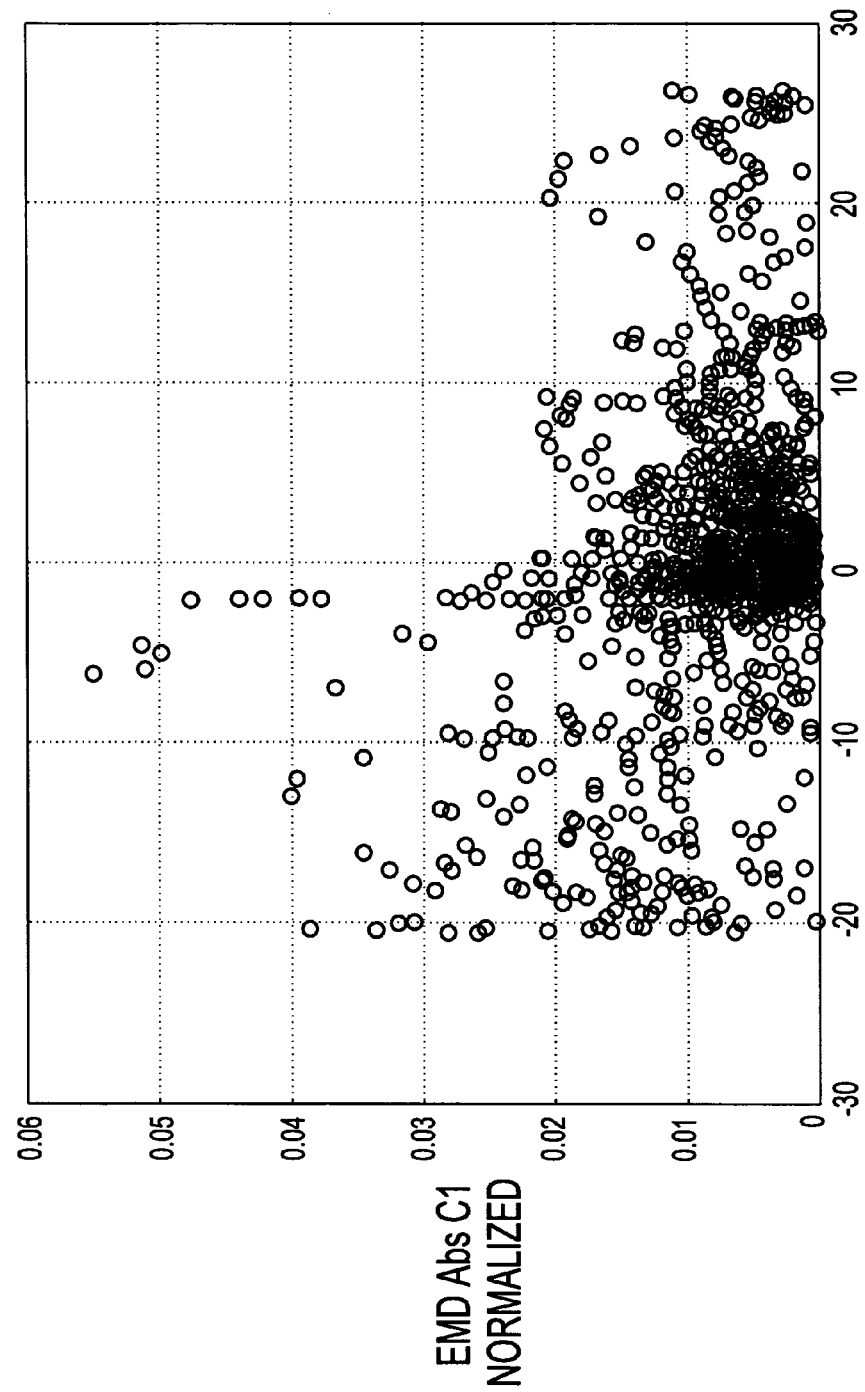

Finally, FIGS. 16A-C show the variability values as a function of the market price slope or gradient of the statistically significant components and in particular, higher variability during the periods of downward market trend may be examined. So, FIG. 16A shows market price gradient for gain defined variability. FIG. 16B shows market price gradient for HL defined variability. FIG. 16C shows market price gradient for EMD defined variability. The tendency of having the higher variability values in the negative market gradient appears to be very clear.

Global Surface Temperature Anomaly Data

Global warming has become a contentious economic and political problem as well been as a scientific issue. Data on the annual global surface temperature anomalies have been painstakingly assembled and are available from the Climate Research Unit (CRU), University of East Anglia, UK, at the Website, e.g., www.cru.uea.ac.uk/cru/data/temperature/. Although, there is no longer any doubt that there has been a warming trend over the last hundred years, the causes as well as the warming rates and, in particular, the precise trend remain unsettled. Studying the intermediate term variability of the climate may help to resolve some of these issues and, in particular, identify the climatological trends.

Figure 17:
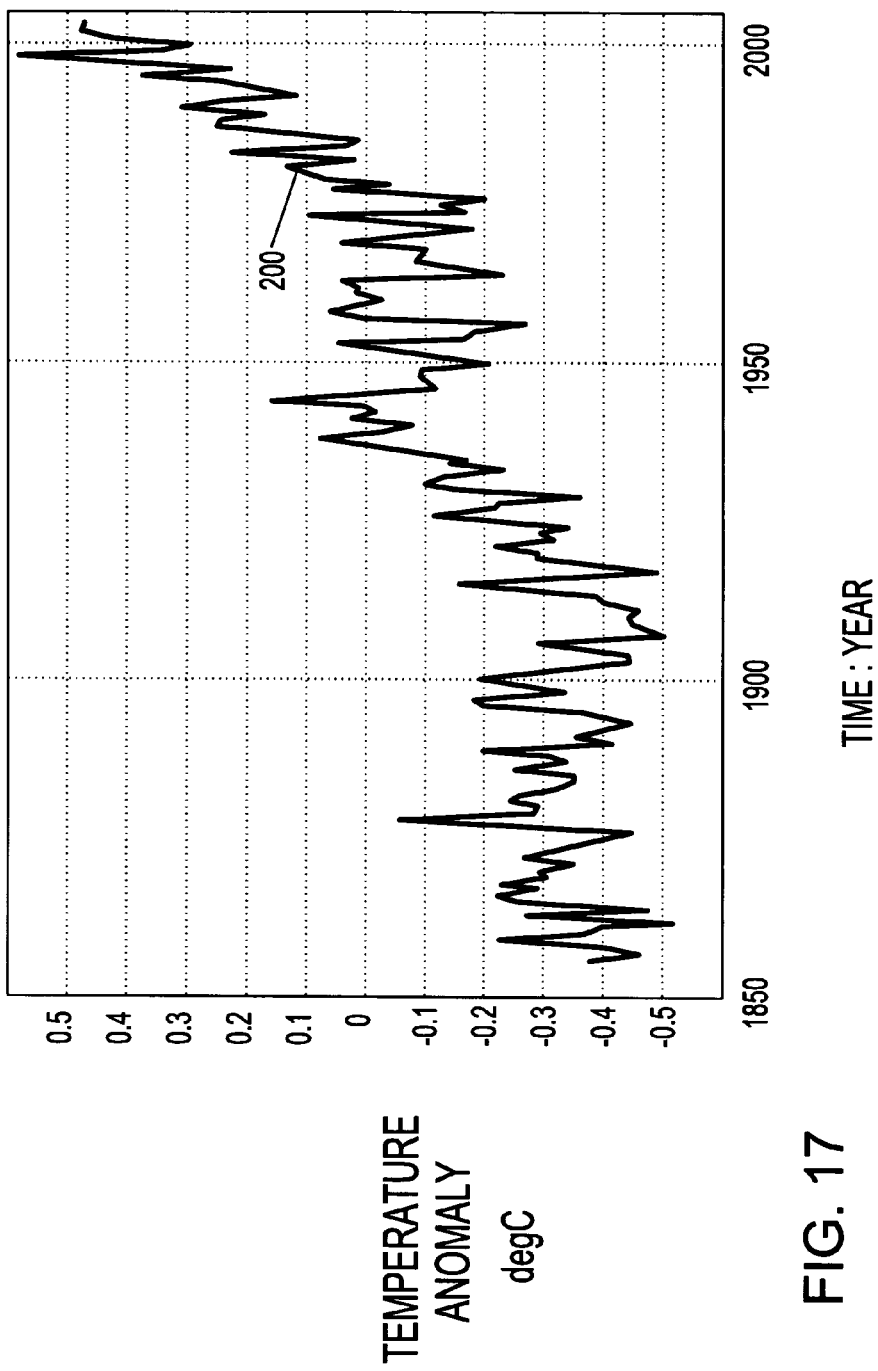
FIG. 17 shows the annual global surface temperature anomalies from 1850-2003, i.e., the residual after removing a climatologic mean based on thirty years mean from 1961 to 1990.

FIG. 17 shows annual global surface temperature anomalies 200 from 1850-2003, i.e., the residual after a climatologic mean based on a thirty year mean from 1961 to 1990 had been removed. As defined according to a preferred embodiment of the present invention, the trend and the associated time scales are defined using EMD. After these data were analyzed using curvature sifting for the extrema sifting, too many inflection points remained, which suggested imbedded hidden scales. FIGS. 18A-L show mean IMFs 202, 204, 206, 208, 210, 212 and standard deviation of IMFs 214, 216, 218, 220, 222, 224 from each of ten different sets of sifting criteria, for the S number from 4 to 13. Each sifting gives six IMF components 202, 204, 206, 208, 210, 212 and 214, 216, 218, 220, 222, 224, respectively, indicating that the siftings are producing extremely stable results. The standard deviation values 214, 216, 218, 220, 222, 224 are about one order of magnitude smaller than the mean values 202, 204, 206, 208, 210, 212.

Figure 19:
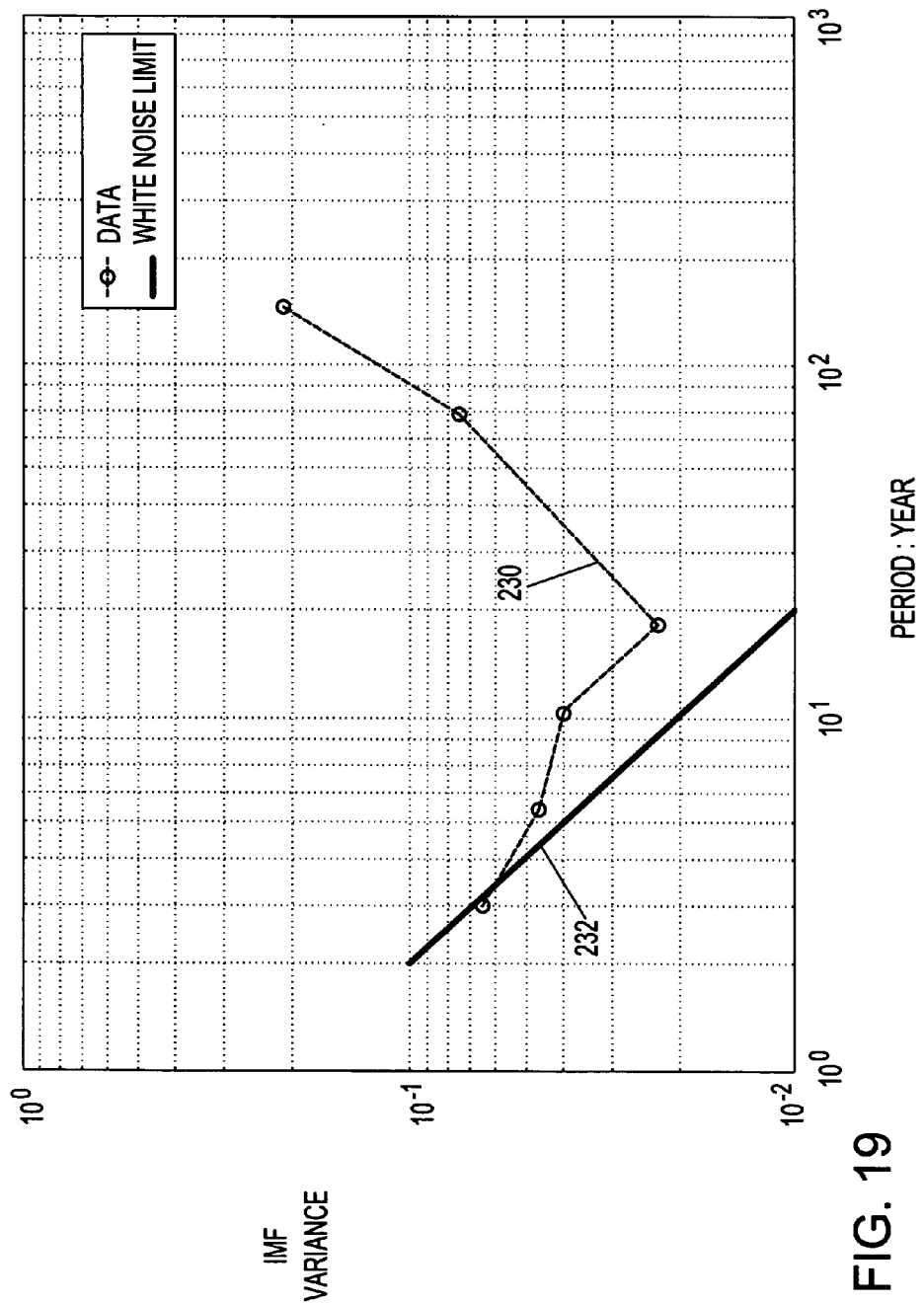
FIG. 19 shows the statistical significance test and indicates the significance of the last two IMFs.
Figure 20:
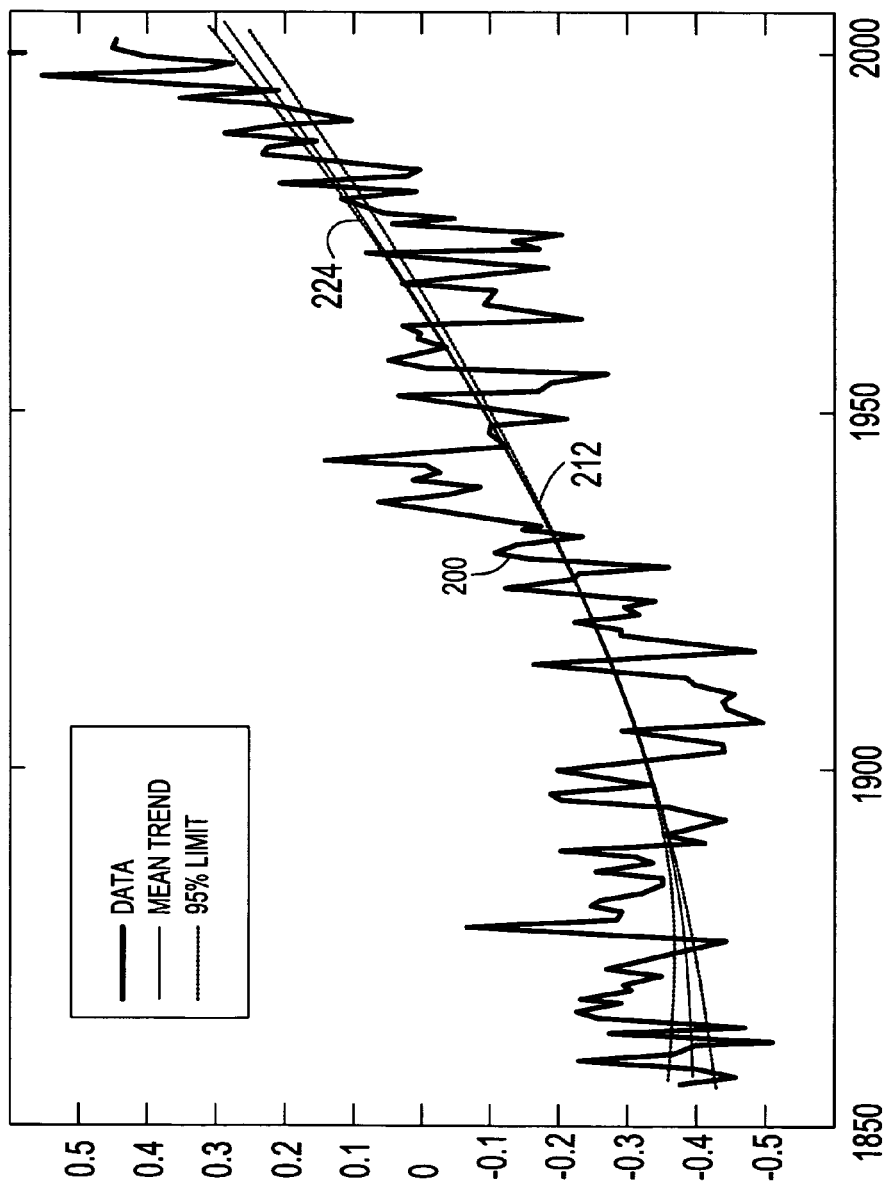
FIG. 20 shows the mean overall trend with its standard deviation.
Figure 21A:
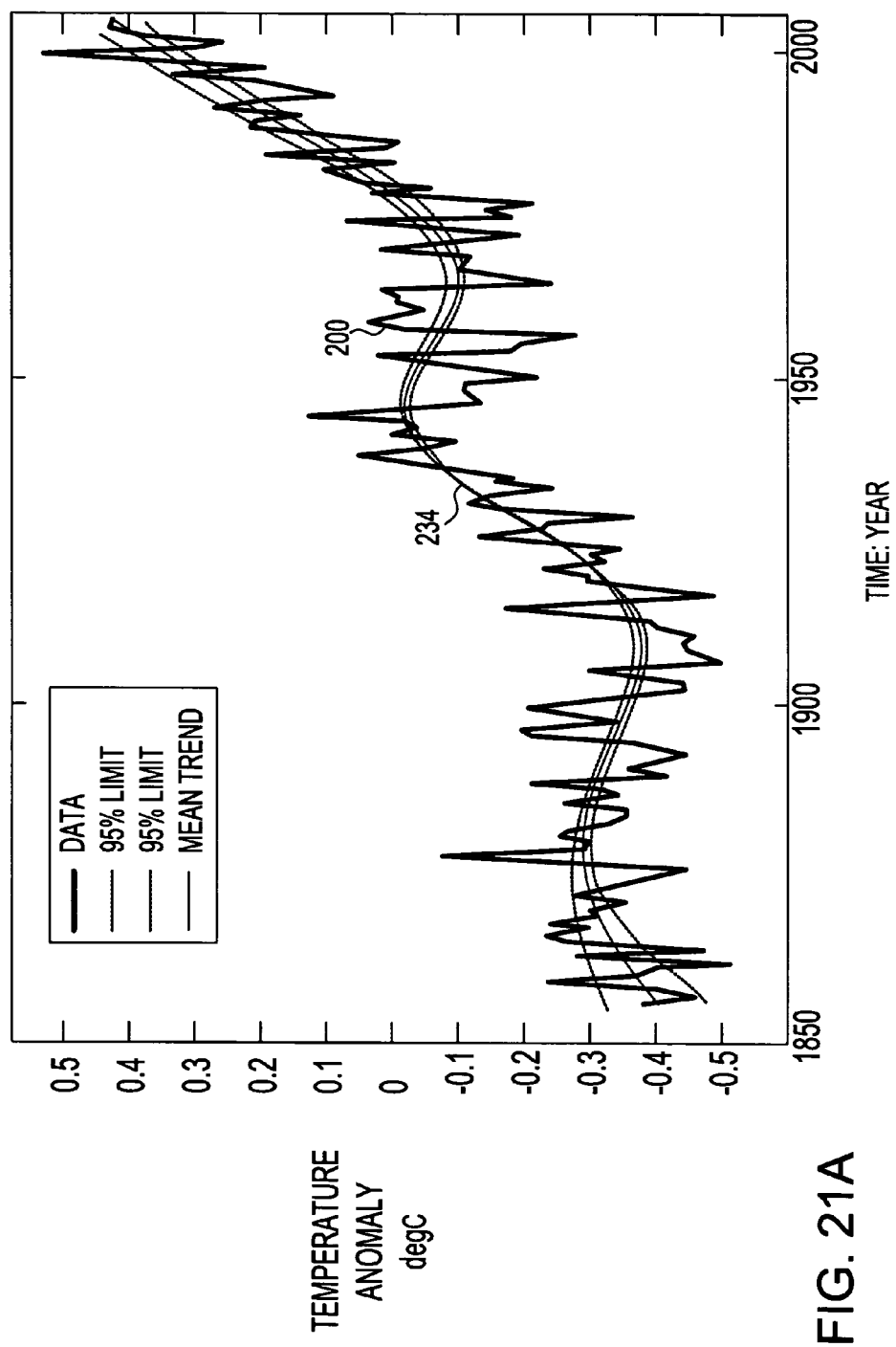
FIGS. 21A-B show selecting a trend with slightly shorter time scale than the overall trend by including the next component and the time scale for the trend.
Figure 21B:
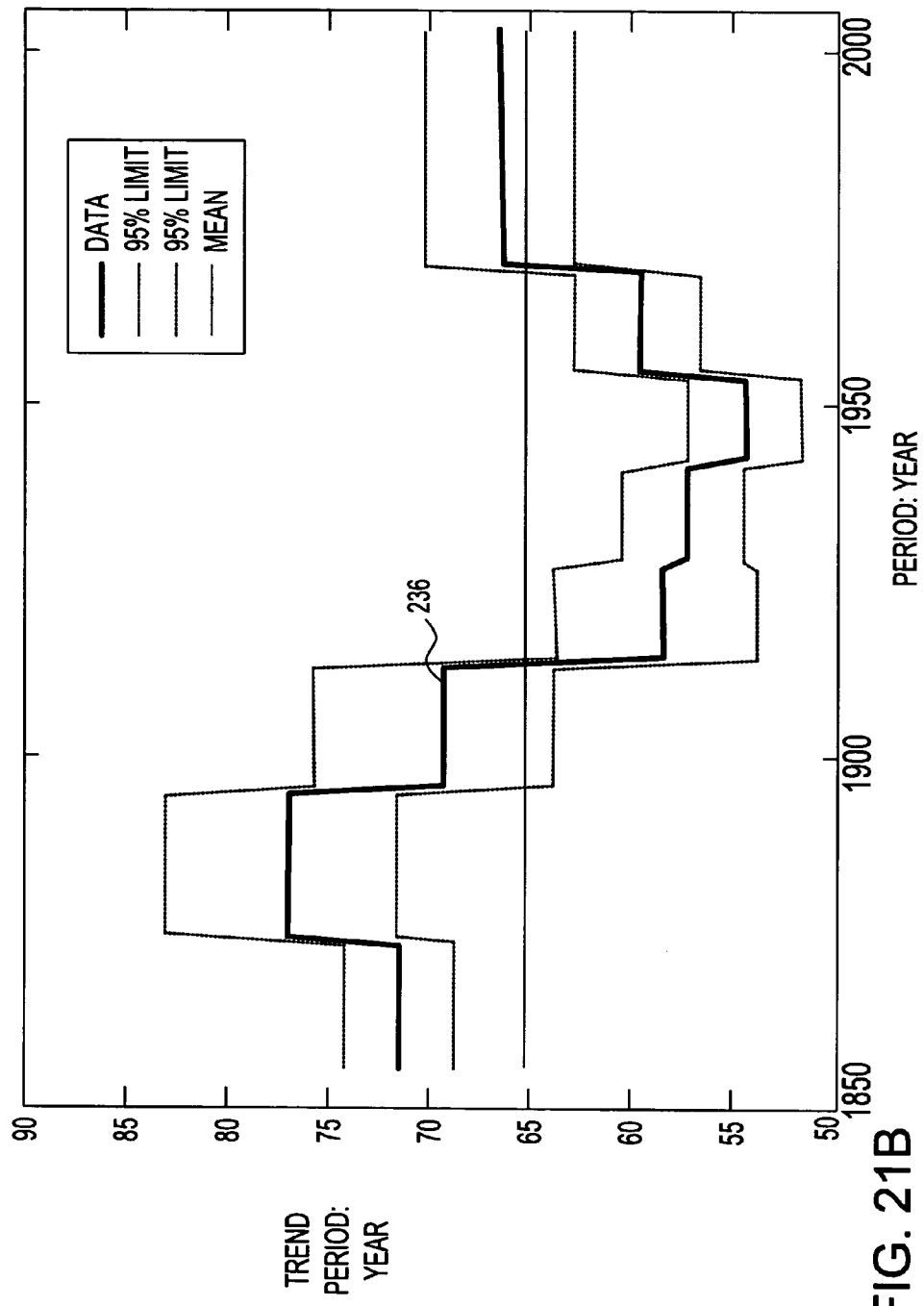
Figure 22A:
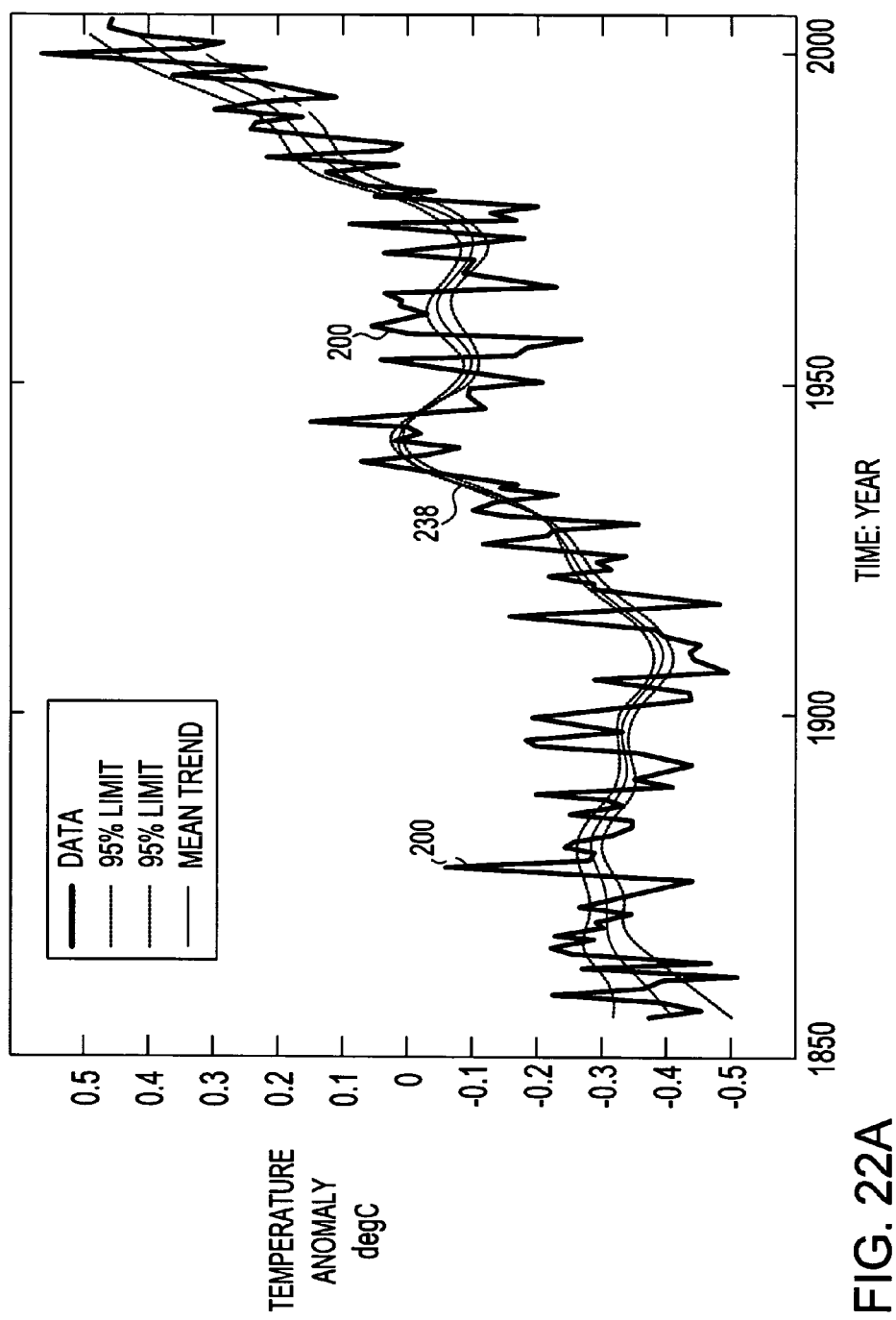
FIGS. 22A-B show selecting a trend with an even shorter time scale than the trend of FIG. 21A by including the next component and the time scale for the trend.
Figure 22B:
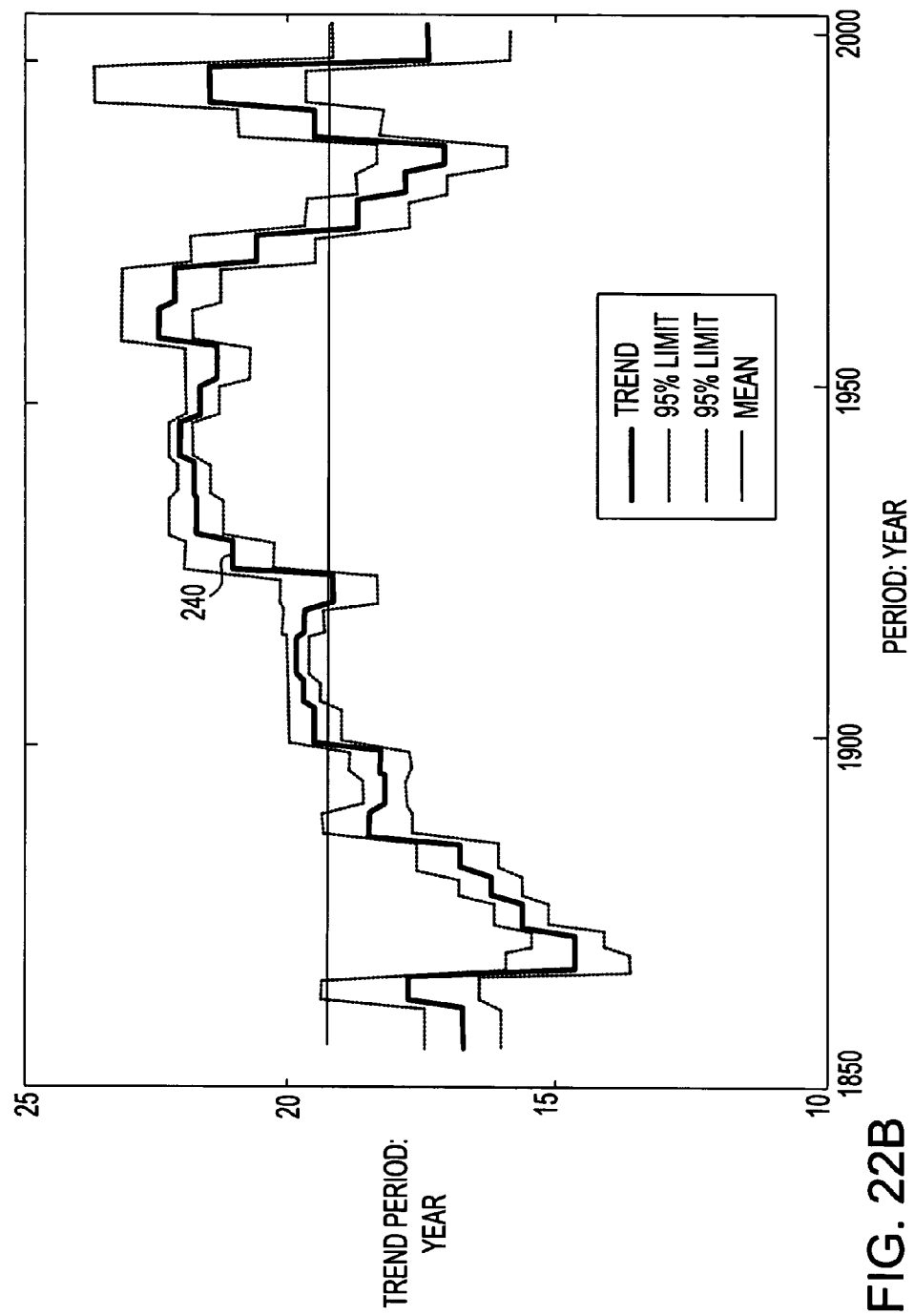
Figure 23A:
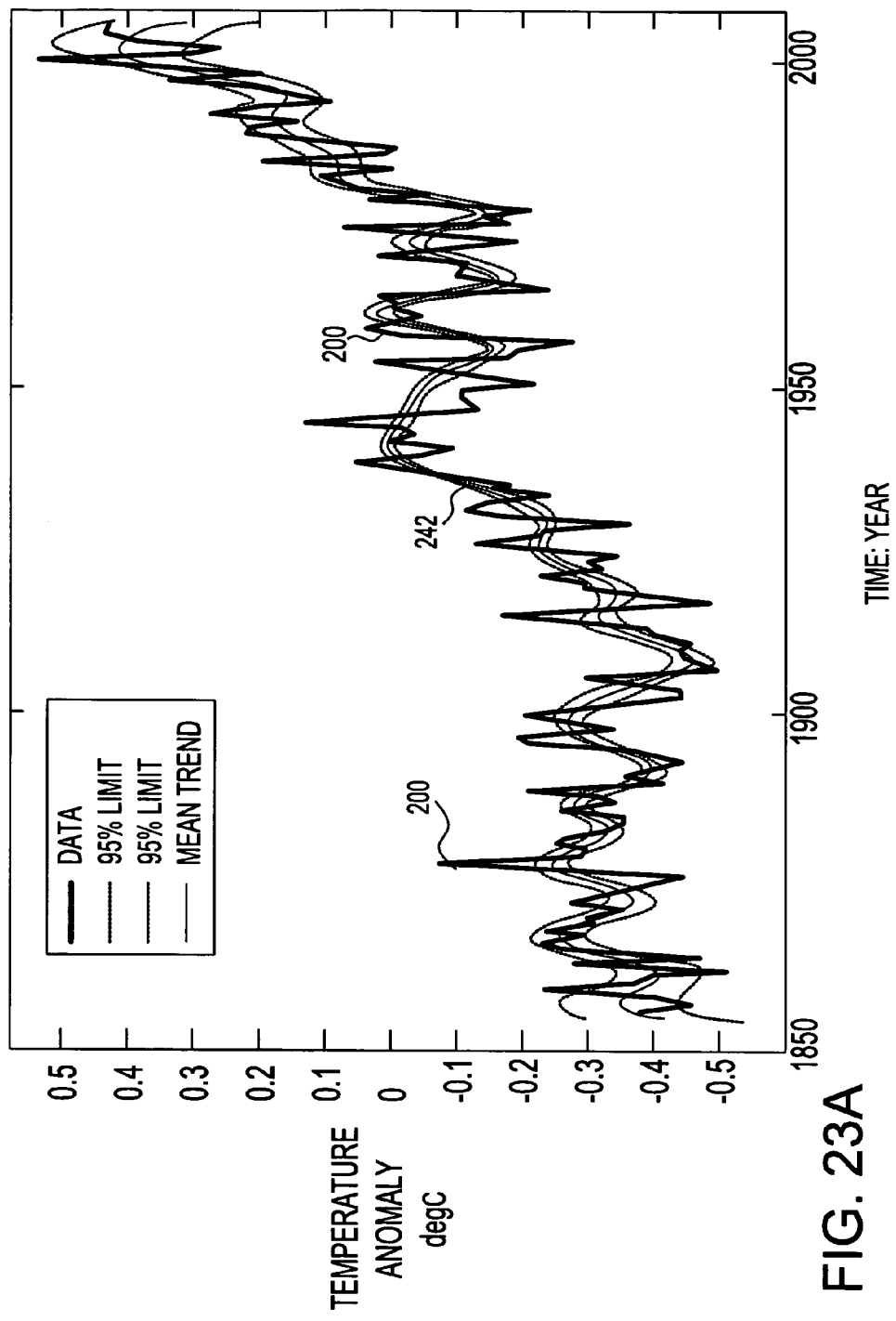
FIGS. 23A-B show selecting a trend with an even shorter time scale than the trend of FIG. 22A by including the next component and the time scale for the trend.
Figure 23B:
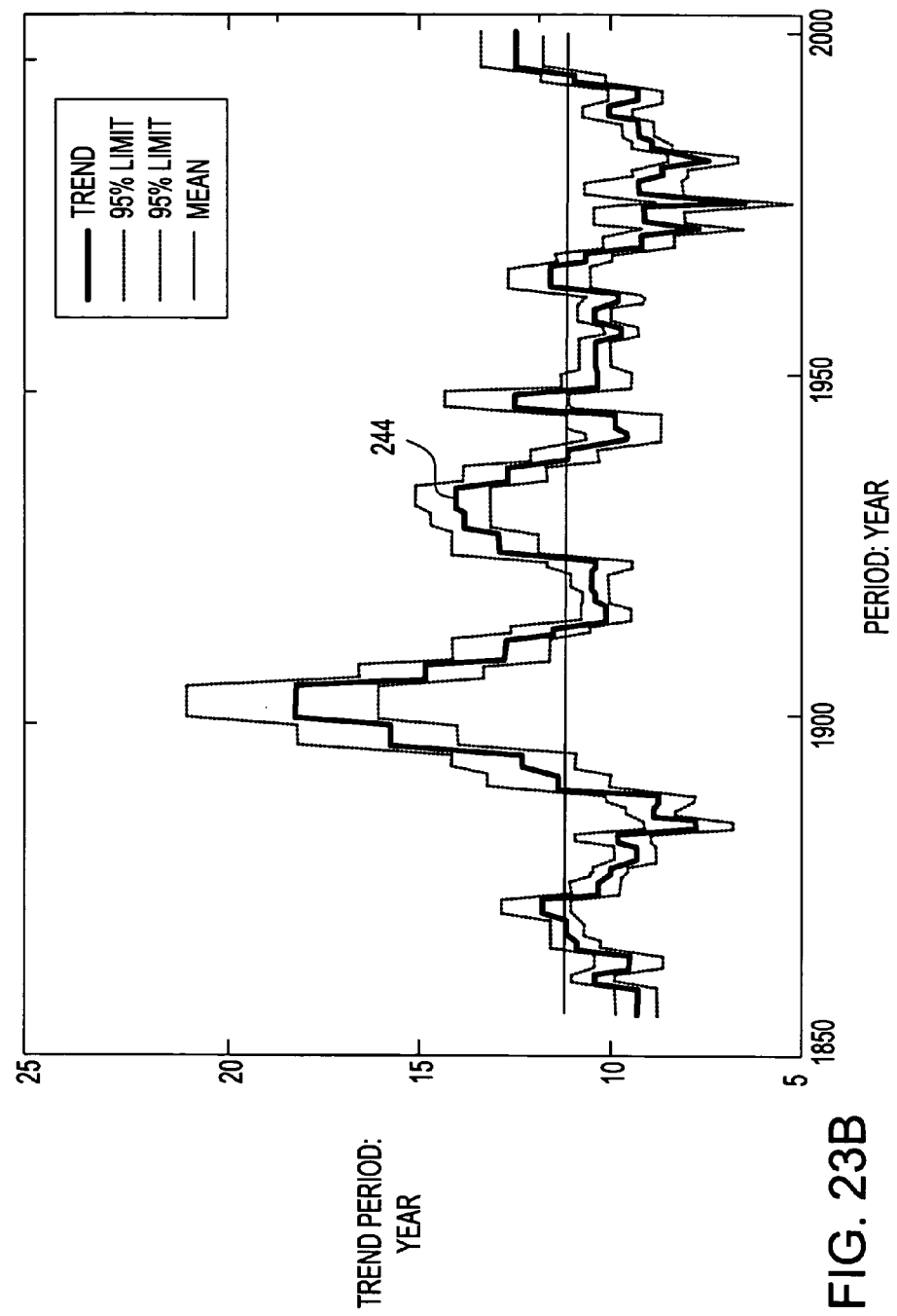

FIG. 19 shows the statistical significance test results 230 as compared with white noise 232, which indicates that the last two IMFs 210, 212 are certainly significant. Accordingly, for this data it would not prove fruitful to pursue the trend to any finer scale, i.e., a time scale less than 20 years is hardly significant. FIG. 20 shows the mean overall trend 212 with its standard deviation 224. As with the above financial data, this trend is neither linear nor quadratic, but intrinsically determined and as indicated by the 95% limit, highly reliable. FIG. 21A shows a first low pass filtering with the next component 210 included for trend 234 with a slightly shorter time scale and FIG. 21B shows the time scale 236 for the trend 234. The time scale 236 is certainly not constant, but it has a mean value slightly higher than 65 years. FIG. 22A shows an expanded low pass filter that includes the next component 208, for a trend 238 with yet a shorter time scale and FIG. 22B shows the time scale 240 for the trend 238. Here the mean value is dropped to about 20 years. FIG. 23A shows a further expanded low pass filter that includes the next component 206 for trend 242 with yet a shorter time scale and FIG. 23B shows the time scale 244 for the trend 242. More reliable trends are based on the longer time scale. Thus, other than the familiar overall global warming trend, the 65 year cycle really stands out.

Advantageously, a precisely defined trend may be intuitively and directly extracted according to the present invention from any data including non stationary time varying data. Once extracted, the trend serves for precisely detrending the data and determining data variance, both important data analysis steps. Instead of the various ad hoc extrinsic methods that have been used to determine the trend, or to detrend the signal source, the preferred embodiment method extracts an intrinsic trend from any nonlinear and nonstationary signal or time series. Thus, the extracted trend is determined by the same mechanisms that generate the data and, therefore, the trend is part of the data. In particular, the extracted trend is an intrinsically fitted monotonic function within the data span, or a function in which there can be at most one extremum.

Further, the preferred embodiment trend identification method adaptively extracts the intrinsic trend. Moreover, the extracted trend is more than simply the overall residue, but also defines an associated time scale. Once the trend is defined, the data may be detrended simply by removing the trend. The variability can be extracted as the residue of the data after trend removal and optionally normalized for comparison against other variability model results.

Furthermore, the preferred signal decomposition method is applicable for extracting a trend from any data with different simple intrinsic oscillation modes. The trend may be extracted from data that may have many different coexisting oscillation modes, at any given time superimposed on each other. Each mode, which may or may not be linear, has the same number of extrema and zero-crossings and oscillates symmetrically with respect to a local mean.

While the invention has been described in terms of preferred embodiments, those skilled in the art will recognize that the invention can be practiced with modification within the spirit and scope of the appended claims.

What is claimed is:

1. A computer implemented method of extracting trend data from a non-stationary time varying phenomena, said method comprising the steps of:

inputting a representation of a non-stationary time varying phenomenon;

recursively sifting said representation using Empirical Mode Decomposition (EMD) to extract an intrinsic mode function (IMF) indicative of an intrinsic oscillatory mode wherein said IM-F is a proto-IMF until said proto-IMF has a zero mean;

filtering said recursively sifted representation including the step of identifying cut off frequencies;

wherein identified said cut off frequencies identify one or more IMF indicating variability of said non-stationary time varying phenomena;

rectifying said identified one or more IMFs;

normalizing rectified said identified ones;

low pass filtering said representation responsive to said cut off frequencies; extracting trend data from said filtered representation; and displaying said extracted trend data.

2. The computer implemented method of claim 1, wherein the step of low pass filtering comprises partially reconstructing said representation.

3. The computer implemented method of claim 2, wherein said partially reconstructed representation has the form $$X_{lk}(t) = \sum_{k}^{n} c_j + r_n,$$

where k identifies a cut off frequency, n is the number of EMD components, $c_j$ represents IMFs, $r_n$ is the final residue and $X_{lk}(t)$ is the extracted trend.

4. The computer implemented method of claim 1, wherein the step of identifying said cut off frequencies further comprises the steps of:

applying a Hilbert transform to each said IMF;

expressing said representation as a real part;

deriving the Hilbert spectrum from said real part; and deriving a marginal spectrum from said Hilbert spectrum, energy in said marginal spectrum identifying said cut off frequencies.

5. The computer implemented method of claim 1, wherein said representation is non-linear.

6. A computer program product for extracting trend data from a non-stationary time varying phenomena, said computer program product comprising a computer readable medium having computer readable program code comprising:

computer readable program code for receiving a representation of a non-stationary time varying phenomenon;

computer readable program code for extracting intrinsic mode functions (IMFs) for Empirical Mode Decomposition indicative of an intrinsic oscillatory mode from a received said representation wherein at least one of said IMFs is a proto-IMF;

the Empirical Mode Decomposition comprises computer readable program code for recursively sifting said representation comprising computer readable program code for extracting a proto-IMF and computer readable program code for extracting said IMF from said proto-IMF by recursively sifting said proto-IMF until said proto-IMF has a zero mean, said recursively sifted proto-IMF being said extracted IMF;

computer readable program code for selectively filtering said extracted IMFs in said representation, said filtered representation indicating trends in said non-stationary time varying phenomenon;

the computer readable program code for selectively filtering comprising:

computer readable program code for identifying cut off frequencies, wherein identified said cut off frequencies identify one or more IMF indicating variability of said non-stationary time varying phenomena;

the computer readable program code for identifying said cut off frequencies further comprising:

a) computer readable program code for applying a Hilbert transform to each said IMF;

b) computer readable program code for expressing said representation as a real part;

c) computer readable program code for deriving the Hilbert spectrum from said real part;

d) computer readable program code for deriving a marginal spectrum from said Hilbert spectrum, energy in said marginal spectrum identifying said cut off frequencies;

e) computer readable program code for rectifying said identified one or more IMFs; and f) computer readable program code for normalizing rectified said identified ones;

computer readable program code for low pass filtering said representation responsive to said cut off frequencies, said low pass filtered representation being said extracted trend; and an output device for displaying said filtered representation indicating trends.

7. The computer program product of claim 6, wherein the computer readable program code for low pass filtering further comprises computer readable program code for partially reconstructing said representation wherein said partially reconstructed representation has the form $$X_{lk}(t) = \sum_{k}^{n} c_j + r_n,$$

where k identifies a cut off frequency, n is the number of EMD components, $c_j$ represents IMFs, $r_n$ is the final residue and $X_{lk}(t)$ is the extracted trend.

8. The computer program product of claim 6, further comprising computer readable program code for removing extracted said trends from said representation.

9. The computer program product of claim 8, wherein the computer readable program code for removing said trends partially reconstructs said representation, said partially reconstructed representation has the form $$X_{hk}(t) = \sum_{1}^{k} c_j,$$

where k identifies a cut off frequency, $c_j$ represents IMFs and $X_{hk}(f)$ is the partially reconstructed representation.

10. The computer program product of claim 6, further comprising computer readable program code for displaying results from said computer readable program code for selectively filtering IMFs.

* * * * *